(12) United States Patent
Velasco

(10) Patent No.: US 10,518,886 B2
(45) Date of Patent: Dec. 31, 2019

(54) SEATING SUSPENSION DIAPHRAGM HAVING INTEGRATED SLIDE-IN ATTACHMENT MEANS

(71) Applicant: Howard Velasco, Bristol, CT (US)

(72) Inventor: Howard Velasco, Bristol, CT (US)

(73) Assignee: Franklin Products, Inc., Torrington, CT (US)

( * ) Notice: Subject to any disclaimer, the term of this patent is extended or adjusted under 35 U.S.C. 154(b) by 115 days.

(21) Appl. No.: 15/656,161

(22) Filed: Jul. 21, 2017

(65) Prior Publication Data

US 2017/0320579 A1 Nov. 9, 2017

Related U.S. Application Data

(63) Continuation of application No. 15/475,824, filed on Mar. 31, 2017.
(Continued)

(51) Int. Cl.
*B64D 11/06* (2006.01)
*B60N 2/58* (2006.01)
*A47C 31/02* (2006.01)

(52) U.S. Cl.
CPC ...... *B64D 11/0647* (2014.12); *B64D 11/0649* (2014.12); *A47C 31/026* (2013.01); *B60N 2/5891* (2013.01)

(58) Field of Classification Search
CPC .......... B64D 11/0647; B64D 11/0649; B64D 25/04; A47C 5/06; A47C 7/021;
(Continued)

(56) References Cited

U.S. PATENT DOCUMENTS

| 2,839,126 | A | 6/1958 | O'Neill | |
| 6,983,997 | B2 * | 1/2006 | Wilkerson | A47C 1/023 |
| | | | | 297/452.13 |
| 2001/0030457 | A1 | 10/2001 | Gregory | |

FOREIGN PATENT DOCUMENTS

WO 2012/106828 A2 8/2012

OTHER PUBLICATIONS

International Search Report for International Application No. PCT/US2018/042991 dated Nov. 29, 2018.
(Continued)

*Primary Examiner* — Christopher J Besler
(74) *Attorney, Agent, or Firm* — McCormick, Paulding & Huber LLP

(57) ABSTRACT

A method of upholstering a seat having a seating frame, and a corresponding attachment assembly, comprises providing a diaphragm generally having a weave of warp and weft yarns with an attachment member for installation of the diaphragm to the seat. The attachment member comprises an adapter strip and a coil member. The coil member is adapted to be intertwined with the weave of the diaphragm and thereafter inserted into and held by the channel in the seating frame. The adapter strip may be connected to the coil member to facilitate feeding the assembly through the channel in the seating frame. Alternately, the adapter strip can replace the channel in the seating frame and instead provide a mounting structure to which the diaphragm can be attached through the coil member's engagement with the adapter strip. A retainer sheet may also be used to maintain a desired tension of the diaphragm during installation.

19 Claims, 20 Drawing Sheets

Related U.S. Application Data

(60) Provisional application No. 62/315,900, filed on Mar. 31, 2016.

(58) Field of Classification Search
CPC ..... A47C 31/02; A47C 31/023; A47C 31/026; B60N 2/5891; B60N 2/6018
See application file for complete search history.

(56) References Cited

OTHER PUBLICATIONS

Written Opinion for International Application No. PCT/US2018/042991 dated Nov. 29, 2018.

\* cited by examiner

SEATING SUSPENSION DIAPHRAGM HAVING INTEGRATED SLIDE-IN ATTACHMENT MEANS

CROSS-REFERENCE TO RELATED APPLICATIONS

This application is a continuation of U.S. patent application Ser. No. 15/475,824, filed Mar. 31, 2017, which claims priority to U.S. Provisional Patent Application Ser. No. 62/315,900, filed Mar. 31, 2016, each of which is hereby incorporated by reference in its entirety.

FIELD OF THE INVENTION

The present invention generally relates to attachment of upholstery and fabric diaphragms to supporting frames, and more particularly relates to methods and articles for attaching fabric diaphragms for seating frames using an attachment member to aid in installation and removal of such diaphragms.

BACKGROUND OF THE INVENTION

Commercial aircraft seating is evolving to satisfy demands for greater comfort within a smaller, lighter package. At the same time, there is a need to reduce manufacturing and maintenance costs. The aircraft seating upholstery has a large influence on comfort, styling, weight and cost.

There are many known designs for seats used in transportation applications as well as for use as furniture. Many such designs utilize fabric diaphragms for the comfort surface or as a support suspension for cushioning. Upholstery for aircraft and other transportation applications usually includes a diaphragm that is used to provide the final layer of comfort control, feel and appearance. The diaphragm is made from many materials, commonly cloth fabrics, natural, reconstituted, and faux leather are used, as well as plastic or polymeric membranes instead of woven fabric or cloth. The fabric material can be an open or closed knit or weave, and often includes elastomeric yarns that provide stretch properties.

The diaphragms typically must be removable for maintenance and cleaning. It is common for diaphragms to be complicated to make and install. Much of the complexity stems from needing to be removable, especially in-the-field, where the seating frame is typically already installed, and thus cannot be disassembled or modified to aid in removal or installation of a replacement diaphragm, if needed. It is common that the installation or removal of a typical diaphragm, especially in-the-field, is a complicated and time consuming process requiring workers skilled in fitting up the diaphragm. This leads to undesirable costs, as rapid installation and removal means shorter assembly times for seat builders and lower maintenance costs for airlines.

Some seats have diaphragms installed with little or no tension, while others have the diaphragm highly tensioned. Most applications for transportation applications, such as automotive, train and aircraft seats, have diaphragms that are stretched tight and held under high tension. High tension typically helps the seat meet comfort, safety and regulatory requirements. However, the high initial tension makes installation and removal of the diaphragm difficult. Often, special attachments are required for installation and removal. Sometimes, special tools and equipment are also needed.

One known method of attaching a diaphragm for transportation seating is with some type of welt cord sewn onto the diaphragm's edge for feeding the diaphragm into a channel or groove in the seating frame. The diaphragm is installed by sliding the welt cord into position, pulling the diaphragm with it, where the welt cord and the edge of the diaphragm are held in place after installation by the channel or groove. While this method can be successful when stretch tensions are low, it becomes increasingly difficult to install such a diaphragm in such a manner as the tension increases. For example, this method has proven difficult with diaphragms held under high pre-tensions typically required for transportation seating. Construction and installation of this type of highly tensioned diaphragm is prone to dimensional inconsistencies at the welt enclosure that can affect the final tensions. Pulling on the welt cord to feed the diaphragm through a channel in the seating frame can easily warp and twist the diaphragm, which throws off the tension and balance of the seat. This can result in less than optimal comfort.

In view of the foregoing, there is a need for an installation and removal method and attachment assembly for facilitating the installation of a diaphragm, and preferably a pre-tensioned diaphragm, to a seating frame without compromising the tensioning of the diaphragm or deforming, warping or twisting the diaphragm during installation or removal. Further, there is a need for a method and article to facilitate the feeding of a pre-tensioned diaphragm through channels formed in a seating frame without compromising the diaphragm in any way. Still further, there is a need for a design that aids in maintaining a desired tensioning in a diaphragm while it is being installed, especially for in-the-field installations, where the seating frame cannot be taken apart or modified. Accordingly, it is a general object of the present invention to provide a diaphragm attachment method and article that improves upon conventional methods currently known in the art and that overcomes the problems and drawbacks associated with such prior art methods.

SUMMARY OF THE INVENTION

The present invention is generally directed to an improved seating suspension diaphragm with a novel attachment system that aids in installation, tensioning, cleaning, maintenance, repair, removal and replacement, especially in-the-field, as needed. Installation and removal of a highly pre-tensioned diaphragm, such as useful for transportation applications, is also made easier. The unique attachment of the present invention overcomes several of the disadvantages of other methods. For example, it allows installation by sliding the diaphragm into position even while under tension, including the high pre-tension levels typically required for transportation seating. In some embodiments, the construction of the diaphragm attachment is uniquely based on the weave of the fabric, making it inherently precise.

The present invention provides a novel method of upholstering a seat having a seating frame, making possible simplified designs that can be quickly installed and removed without tools or the usual painstaking effort needed to achieve a tight, high-level fit and finish. Rapid installation and removal means shorter assembly times for seat builders, quicker repair or replacement, as needed, and lower maintenance costs for airlines. A simplified upholstery provided through the present invention is less expensive to make and easier to repair, clean and replace.

In a first aspect of the present invention, a diaphragm comprising a weave of warp and weft yarns is provided with an attachment member for installation of the diaphragm in a seating frame. The seating frame includes a channel adapted to receive a portion of the diaphragm. The diaphragm includes an attachment zone free of weft yarns, and a selvage area between the attachment zone and the vertical edge of the diaphragm. The attachment member comprises an adapter strip including a line of perforations on a first edge and a coil member adapted to be threaded through the perforations. The coil member preferably has a pitch that complements the spacing of the warp yarns of the diaphragm. For installation of the diaphragm, the diaphragm is attached to the coil member, and a free second edge of the adapter strip is pulled to feed the coil member and diaphragm through the channel of the seating frame.

In a first embodiment, the coil member is positioned in the attachment zone of the diaphragm and an elongated bead member is positioned between the warp yarns of the diaphragm in the attachment zone and the coil member such that when the selvage area of the diaphragm is folded about the bead member, the diaphragm is secured to the coil member by pinching the bead member therebetween. The adapter strip is folded to a position adjacent to, and more preferably flush with the diaphragm.

In a second embodiment, the coil member is positioned in the attachment zone of the diaphragm with each individual loop being positioned between adjacent warp yarns, such that as the selvage area is folded back toward the diaphragm, each warp yarn in the attachment zone overlaps a respective loop of the coil member. The adapter strip is folded to a position adjacent to, and more preferably flush with the diaphragm.

In another embodiment, the adapter strip is not needed, and the coil member is attached to the diaphragm in either of the above-mentioned manners and thereafter fed through the channel of the seating frame to install the diaphragm and hold it in place once installed.

In another aspect of the present invention, a diaphragm is adapted for installation in a seating frame, where the seating frame includes vertical adapter strips attached thereto, each said adapter strip comprising a line of perforation on the outer edge thereof. The diaphragm comprises a weave of warp and weft yarns and preferably includes an attachment zone free of weft yarns and a selvage area between the attachment zone and the vertical edge of the diaphragm. A coil member comprises a series of loops and defines a pitch that complements the spacing of the warp yarns in the diaphragm. For installation, the diaphragm is attached to the coil member at the attachment zone and the coil member is threaded through the line of perforations to feed the diaphragm down the adapter strip for installation of the diaphragm to the seating frame.

In yet another aspect of the present invention, a diaphragm comprising an open weave of warp and weft yarns is provided with an attachment member for installation of the diaphragm in a seating frame having a channel adapted to receive a portion of the diaphragm. The attachment member comprises an adapter strip and a coil member. The coil member is adapted to be intertwined with the weave of the diaphragm and thereafter inserted into and held by the channel in the seating frame. The adapter strip comprises a web having an open loop fringe on a first edge thereof and a free second edge, whereby the coil member is fed through the open loops of the adapter strip to secure said adapter strip to the coil member. Preferably, the coil member is simultaneously fed through the open loop of the adapter strip and the weave of the diaphragm. Once the attachment member is attached to the diaphragm, the coil member can be fed through the channel of the seating frame by pulling on the second edge of the adapter strip.

In yet another aspect of the present invention, a closed weave diaphragm is provided with an attachment member for installation of the diaphragm in a seating frame having a channel adapted to receive a portion of the attachment member to hold the diaphragm in place relative to the seating frame. The attachment member comprises an adapter strip and a coil member. The adapter strip comprises a web having an open loop fringe on a first edge thereof and a second edge that is secured to the diaphragm so that the open loops project away from the diaphragm. The coil member is threaded through the open loops and thereafter fed through the channel to install the diaphragm to the seating frame. If necessary, the adapter strip can be pulled to aid in feeding the coil member through the channel.

In still another aspect of the present invention, a diaphragm comprising an open weave of warp and weft yarns is provided with a coil member for installation of the diaphragm in a seating frame having a channel adapted to receive at least the coil member to position the diaphragm relative to the seating frame. The coil member comprises a series of loops, wherein each of said loops is threaded around at least one of a weft yarn and a warp yarn. Preferably, each loop is threaded around one warp yarn and at least one weft yarn. More preferably, each loop is threaded around one warp yarn and two adjacent weft yarns.

Preferably, the coil member has the same length dimension as the vertical edges of the diaphragm to which it is adapted to be attached. Additionally, where an adapter strip is provided to aid in installation of a diaphragm to a seating frame, the adapter strip preferably has a longitudinal length that generally matches the length of the coil member, and as a result, the length of the vertical edges of the diaphragm In another aspect of the present invention, a method for upholstering a seating frame comprises providing a diaphragm, and attaching an attachment member to said diaphragm. The attachment member includes at least a coil member, and may further include an adapter strip adapted for connection to the coil member to aid in the installation of the diaphragm. The method further includes feeding at least the coil member through a channel in the seating frame until the diaphragm is in a desired position relative to the seating frame.

In another aspect of the present invention, a method for upholstering a seating frame comprises providing an open weave diaphragm comprising interwoven warp and weft yarns and defining an attachment zone proximate a first edge of the diaphragm and a selvage area defined between the attachment zone and the edge of the diaphragm. The method further comprises attaching an attachment member to said diaphragm in the attachment zone thereof, said attachment member including a coil member, and positioning at least the coil member relative to the seating frame to install the diaphragm.

In still another aspect of the present invention, a retainer sheet is provided to aid in installation of a pre-tensioned diaphragm. More particularly, the retainer sheet is used to maintain the tension in a pre-tensioned and stretched open weave diaphragm during installation. Such a retainer sheet includes a base membrane having a plurality of projections extending normally therefrom for insertion into and through the openings of the diaphragm during use. The projections are designed to have a size and shape that complement the size and shape of the openings in the diaphragm after it has been stretched to the desired dimensions needed for installation into the seating frame. The projections are preferably inserted far enough so that the base membrane of the retainer sheet is adjacent to and, more preferably, flush with the diaphragm. Once installed, the projections prevent the openings from returning to their free-state size and condition, since the projections are relatively incompressible and resist the contraction of the tensioned warp and weft yarns of the diaphragm. Therefore, the tensioned yarns and openings cannot contract, and thus, the diaphragm is held in its pre-tensioned, stretched condition until the retainer sheet is removed, such as by a peeling action to disengage the projections from the openings of the diaphragm. Preferably, the retainer sheet is reusable.

As noted above, rapid installation and removal of a diaphragm to a seating frame means shorter assembly times for seat builders and lower maintenance costs for airlines.

While the present invention is generally described for installation, removal and replacement for aircraft seating applications, the same advantages would be provided for automotive or mass transit seating, office or residential seating, or for securing fabric and other woven, non-woven and flexible materials to frames for other purposes. For example, embodiments of the present invention could be used to attach suspension diaphragms to seating frames. Equally, other embodiments of the present invention could be used to fasten flexible membranes to frames for applications such as awnings, tents, and the like. The described invention could further be used to secure covers for trailers, boats or truck beds.

These and other objects, features and advantages of the present invention will become apparent in light of the detailed description of embodiments thereof, as illustrated in the accompanying drawings.

DETAILED DESCRIPTION OF THE DRAWINGS

The present invention is generally directed to methods and articles to aid in installation and removal of a diaphragm from a seating frame. The present invention is especially suited for transportation applications, where it is desirable to install a pre-tensioned diaphragm to a seating frame, such as a seat back for an aircraft seat.

Figure 1:
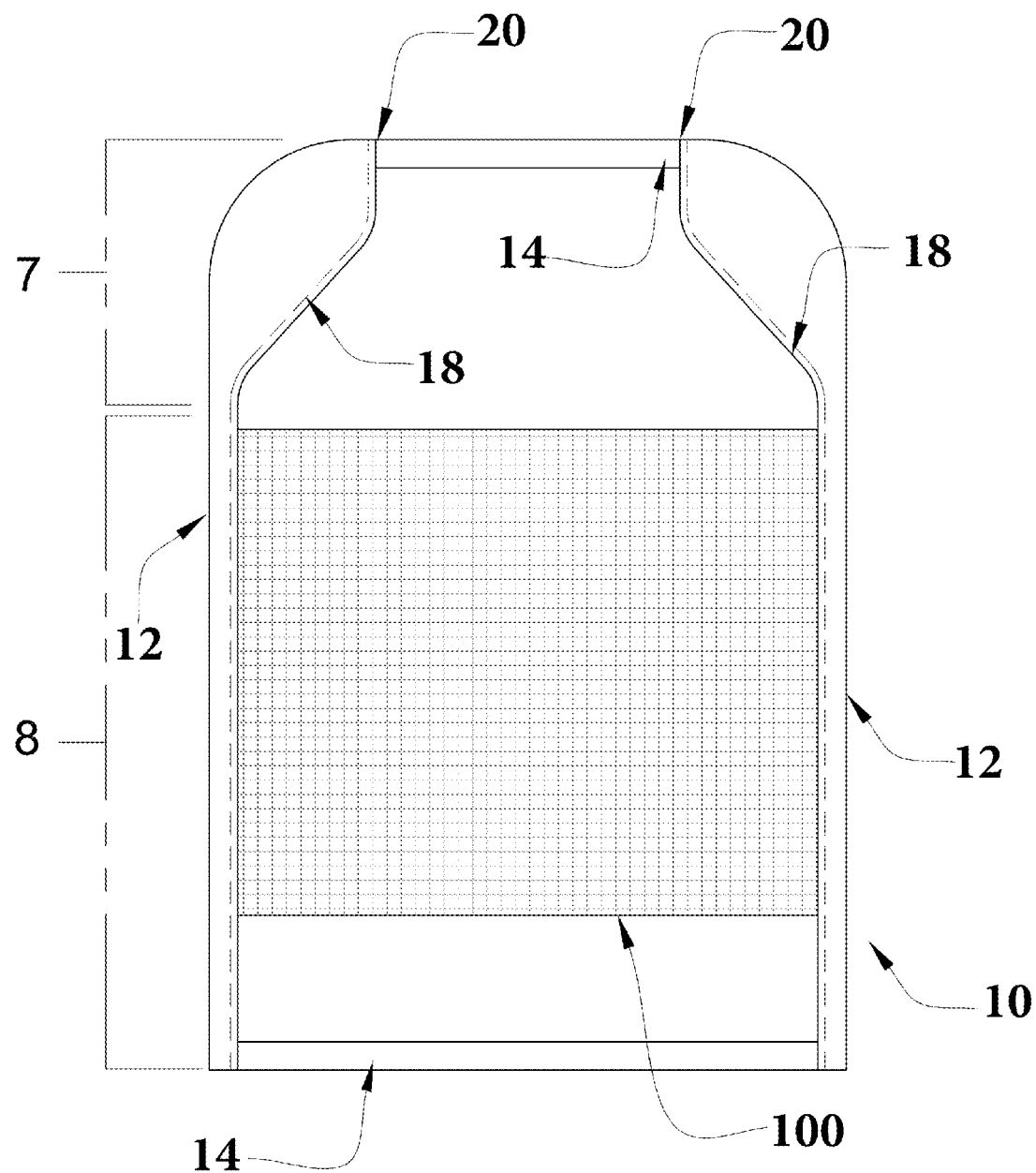
FIG. 1 illustrates a front, planar view of a seating frame with a diaphragm installed in accordance with the present invention.

Referring to FIG. 1, a seating frame typically useful for an aircraft seat back is illustrated and generally designated as reference numeral 10. Though shown and described herein in connection with upholstering an aircraft seat back, the present invention can be used to upholster a seat bottom using the same methods and components without departing from the spirit and principles of the present invention. Moreover, the present invention can be used for all types, styles, shapes and designs of chairs, and is not restricted to use in aircraft or transportation applications.

As illustrated, the seating frame 10 includes left and right vertical frame members 12 connected, in part, by upper and lower cross members 14. As illustrated, a diaphragm 100 comprising a partial open mesh fabric is installed in the seating frame 10. While seats having mesh diaphragms already exist, the present invention utilizes a novel attachment method and arrangement that uses the weave of the diaphragm 100 itself as a holding member.

Figure 7:
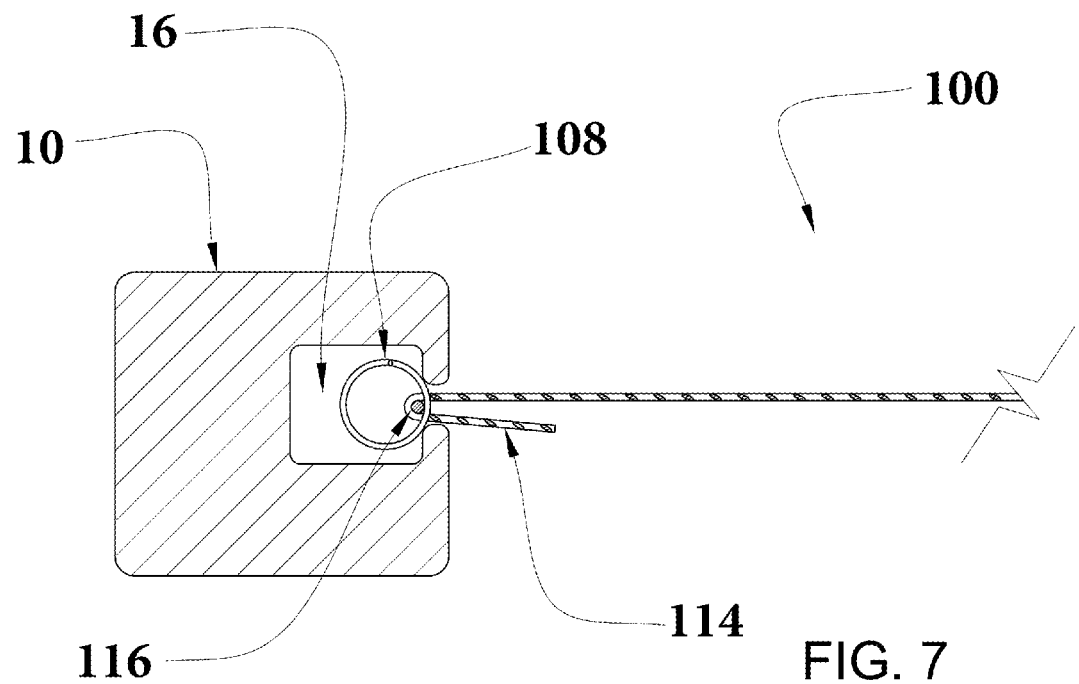
FIG. 7 provides an end cross-sectional view of the attachment assembly of FIG. 5 installed in a seating frame in accordance with the present invention.
Figure 8:
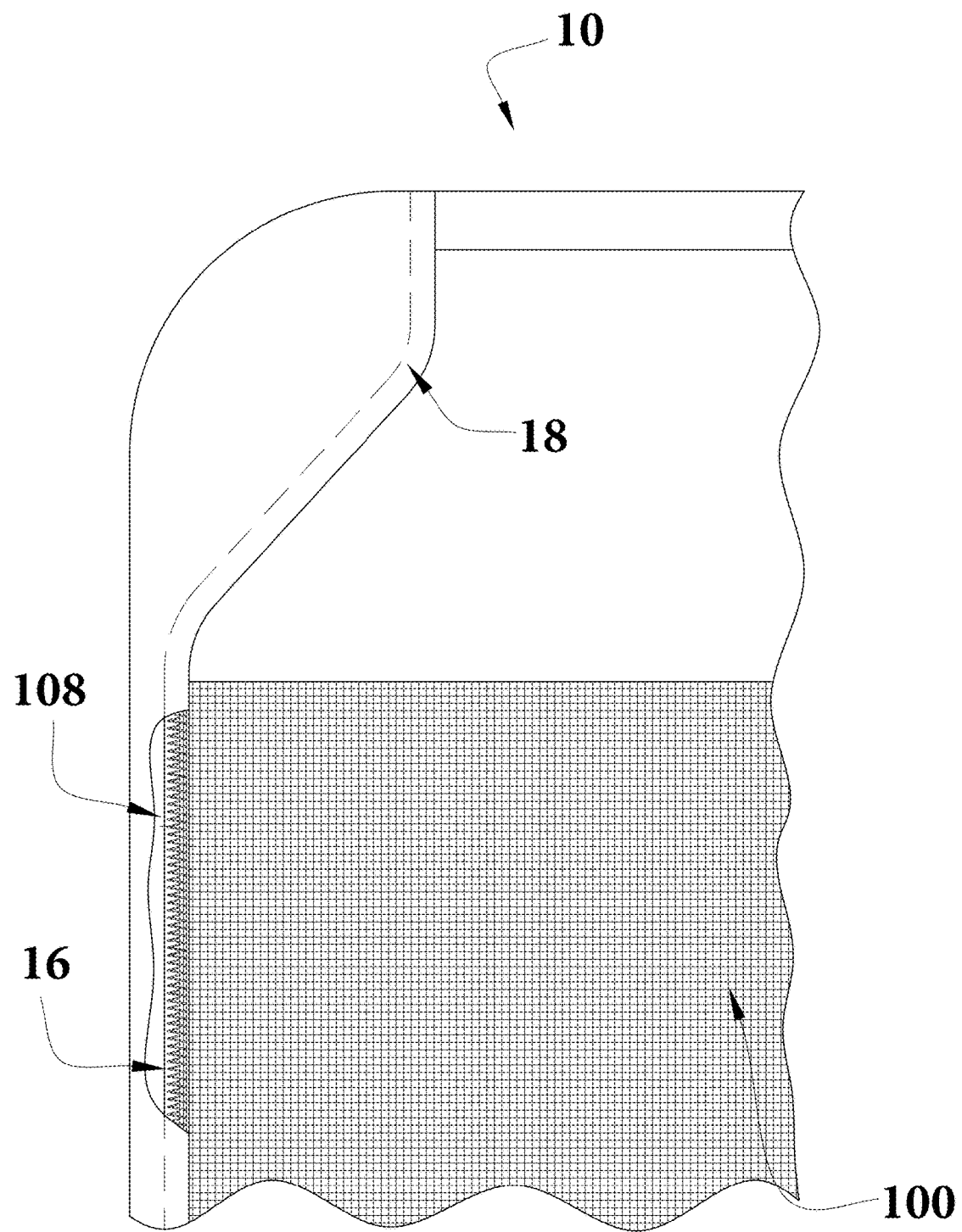
FIG. 8 provides a partial front planar view of the seating frame of FIG. 1 with a portion cutaway to illustrate the installation of the diaphragm in accordance with an embodiment of the present invention.

The seating frame 10 preferably includes channels 16 along the vertical frame members 12 that are used for holding the diaphragm 100 in place. The channels 16 are also used for the installation of the diaphragm 100. The path of the channels 16 in FIG. 1 is generally illustrated by the dotted lines 18. A cross-sectional view of a channel 16 in which an edge of the diaphragm 100 and an attachment member including a coiled element, as described in more detail below, are disposed and secured after installation, is illustrated in FIG. 7. FIG. 8 provides a partial cut-away view to illustrate the channel 16 in one of the vertical frame members 12. Preferably, the channel 16 extends along the vertical length of the seating frame 10, and, as noted, facilitates installation, removal and retention of the diaphragm 100 in a pre-tensioned state.

Referring to again FIG. 1, the seating frame 10 is designed to have a portion at the upper part of the frame that is narrower than the main body and width of the diaphragm 100, and that acts as an area with little tension. This low-tension area is illustrated in FIG. 1 and designated by reference numeral 7. An entrance point 20 to each of the left and right channels 16 is included at the top of the low-tension area 7. These entrance points 20 provide a location where the diaphragm 100 can be easily engaged with and fed into the channels 16. When installing the diaphragm 100, the edge of the diaphragm 100, with an attachment member attached thereto in accordance with embodiments of the present invention, is first engaged into the channels 16 at the low-tension area 7 and then slid along, within the channels 16, gaining or maintaining tension as the diaphragm 100 is moved beyond the low-tension are 7 into the full width section, or full-tension area 8, of the frame 10. The transition from the entrances 20 of the low-tension area 7 to the full-tension area 8 is gradual enough to allow the diaphragm 100 to come under increasing tension, where necessary, or to maintain a pre-tensioned condition, without becoming caught or hung up in the channels 16, or distorted or warped because of being pulled through the channels 16.

Figure 2:
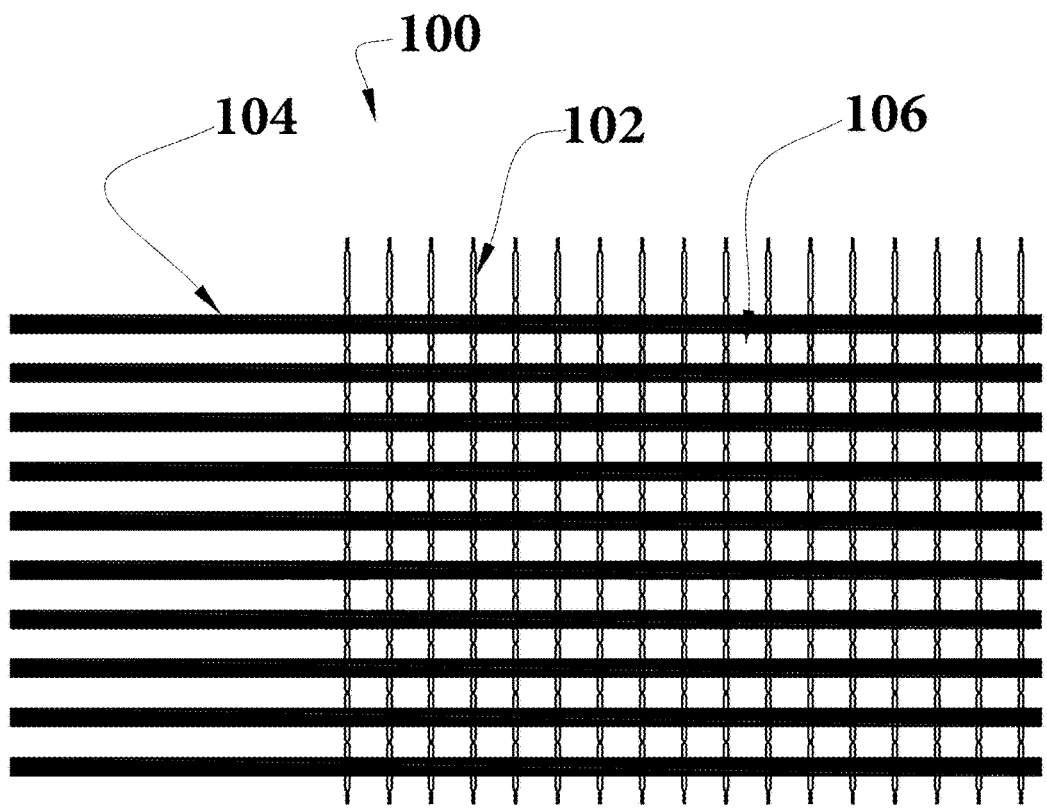
FIG. 2 illustrates an exemplary open weave fabric diaphragm for use in embodiments of the present invention.

As will be discussed herein, the present invention can be used with open mesh and closed fabric weaves. An open mesh diaphragm, generally illustrated in FIG. 2, comprises interwoven warp and weft yarns 102 and 104, respectively, that define open spaces or openings 106 in the diaphragm 100. An open mesh fabric for use as a diaphragm in accordance with the present invention preferably comprises a leno weave having coextruded elastomer monofilaments in the warp direction and high tenacity polyester yarns in the weft direction. The monofilaments are preferably thermally fused at their normal weave junctions (as is often done with coextruded monofilament yarns).

Figures 3A, 3B:
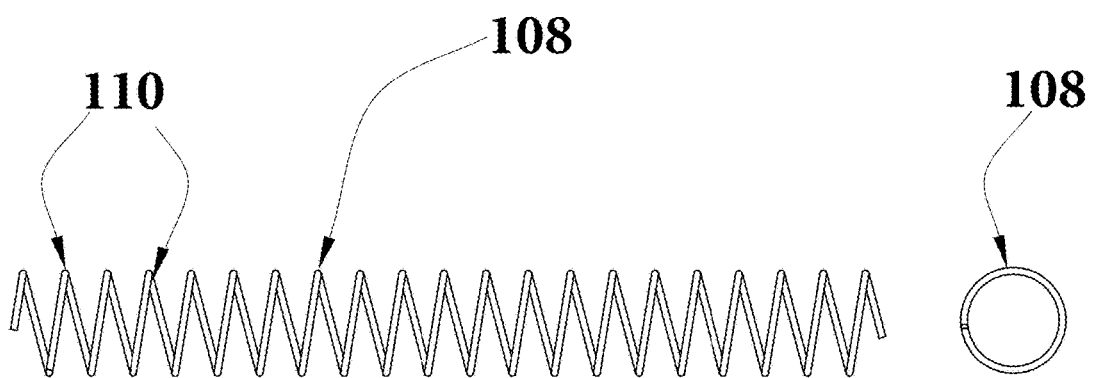
FIGS. 3A and 3B provide a planar front view and a planar end view, respectively, of a coil member for use in embodiments of the present invention.

A coil member 108 that may be used to facilitate installation and removal of a diaphragm in accordance with embodiments of the present invention is illustrated in FIGS. 3A and 3B. As shown, the coil member 108 comprises a series of loops 110 similar to the design of a compression spring, that are preferably wound in a spiral with a pitch and spacing that complement the spacing of the warp yarns 102 in the diaphragm 100 that will be put or held under tension. The coil member 108 can be a metal wire or other suitable material, such as extruded plastic. For transportation applications, spring tempered 302/304 stainless steel wire is recommended. Alternately, extruded polycarbonate can be used for such transportation applications. Both stainless steel and polycarbonate materials have the necessary physical properties and meet regulatory flammability requirement for such applications.

The diameter of the coil member 108, generally represented in FIG. 3B for illustration purposes, can be varied, again depending on the size of the diaphragm and the amount of tension required for use once installed. In preferred embodiments, the diameter of the coil member 108 is sized to allow each loop 110 to encompass two weft yarns 104 at their normal spacing, and/or be equal to the distance between the centers of two open spaces 106 that are separated by one warp yarn 102.

Using such a coil member 108 greatly reduces the friction between the diaphragm 100 and the seating frame 10, allowing the diaphragm 100 to be easily slid into position even as the diaphragm 100 comes under tension or when it is already pre-tensioned, by advantageously using the combined flexibility and strength of the coil member 108. Indeed, the coil member 108 is flexible in all directions, allowing it to conform to seating frames having contours in multiple planes, without compromising its strength.

Figure 4:
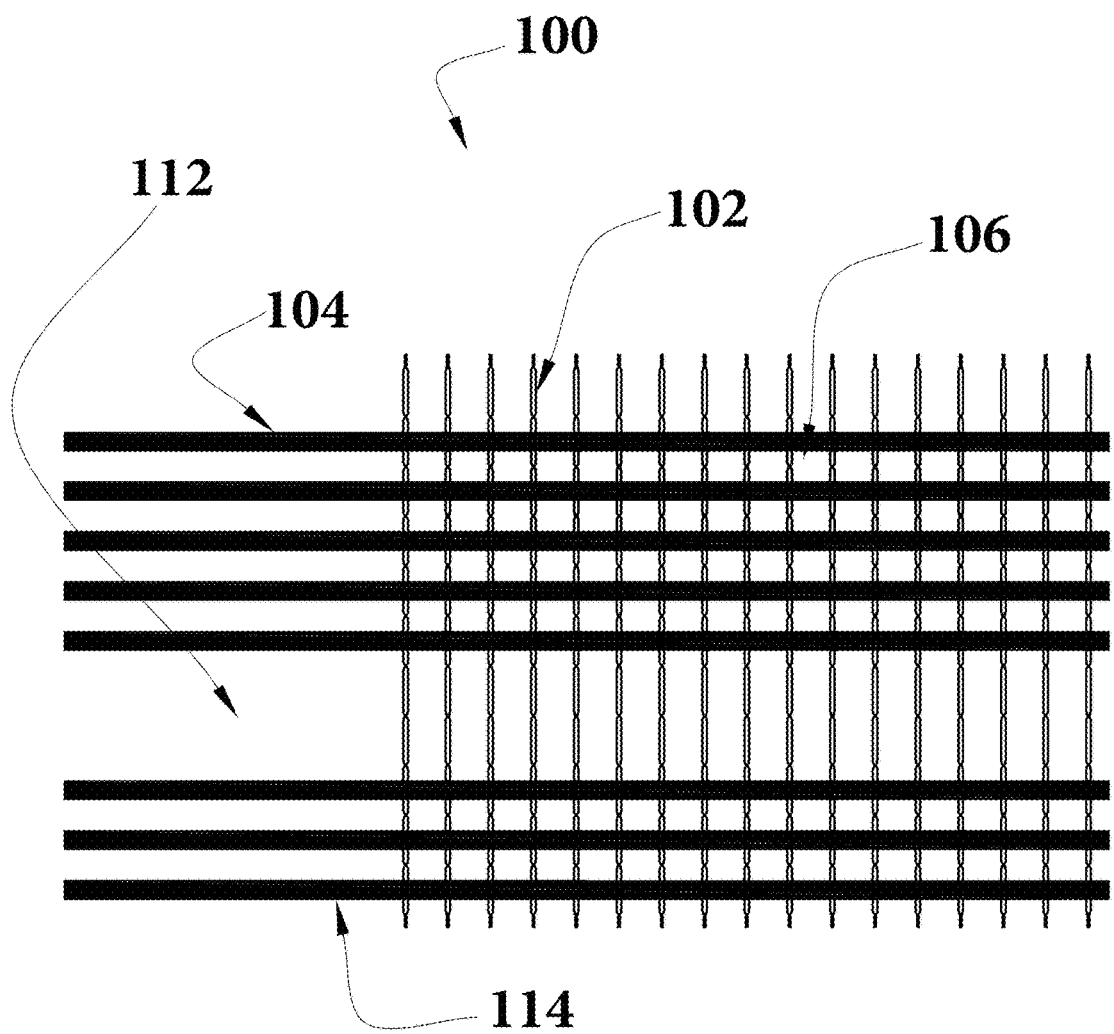
FIG. 4 illustrates an alternate design of an open weave fabric diaphragm for use in embodiments of the present invention.
Figure 12:
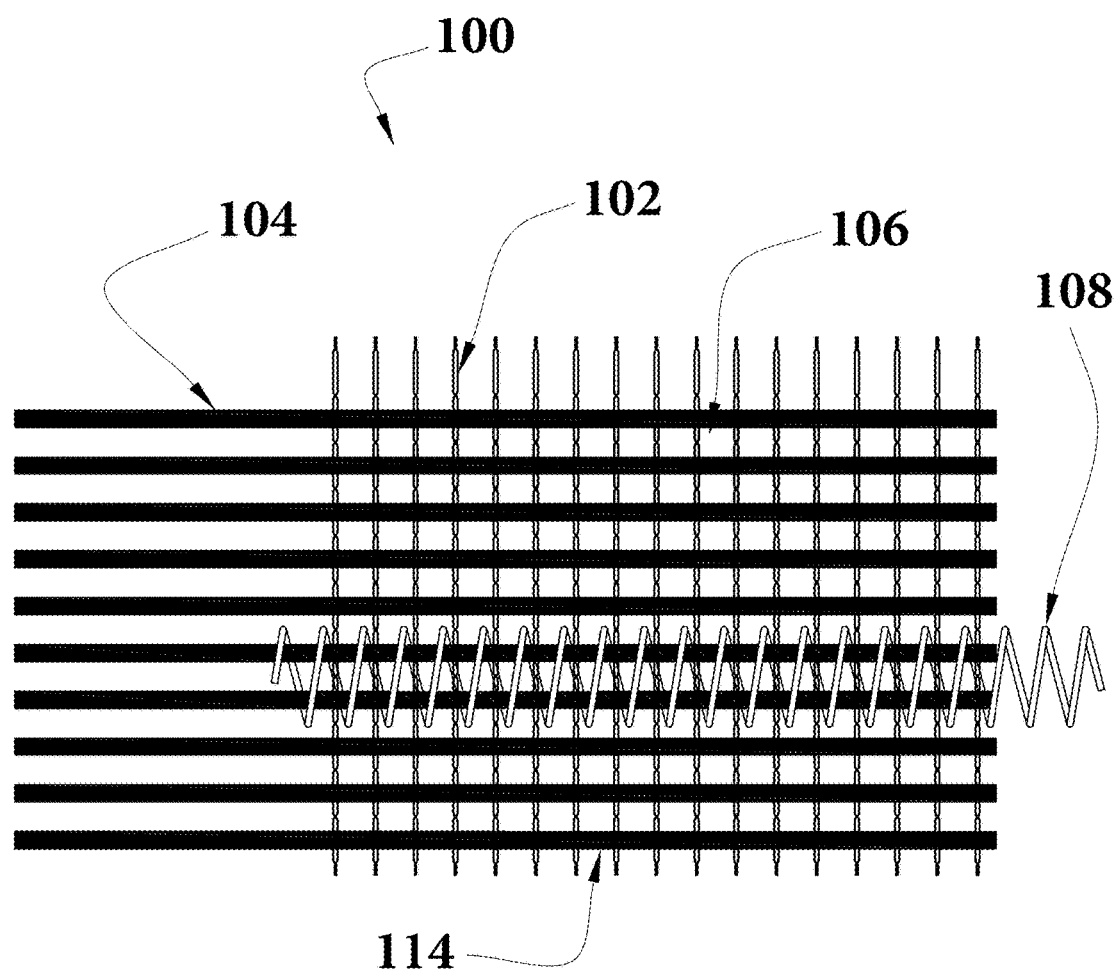
FIG. 12 illustrates a planar view of an attachment assembly in accordance with another embodiment of the present invention.
Figure 13:
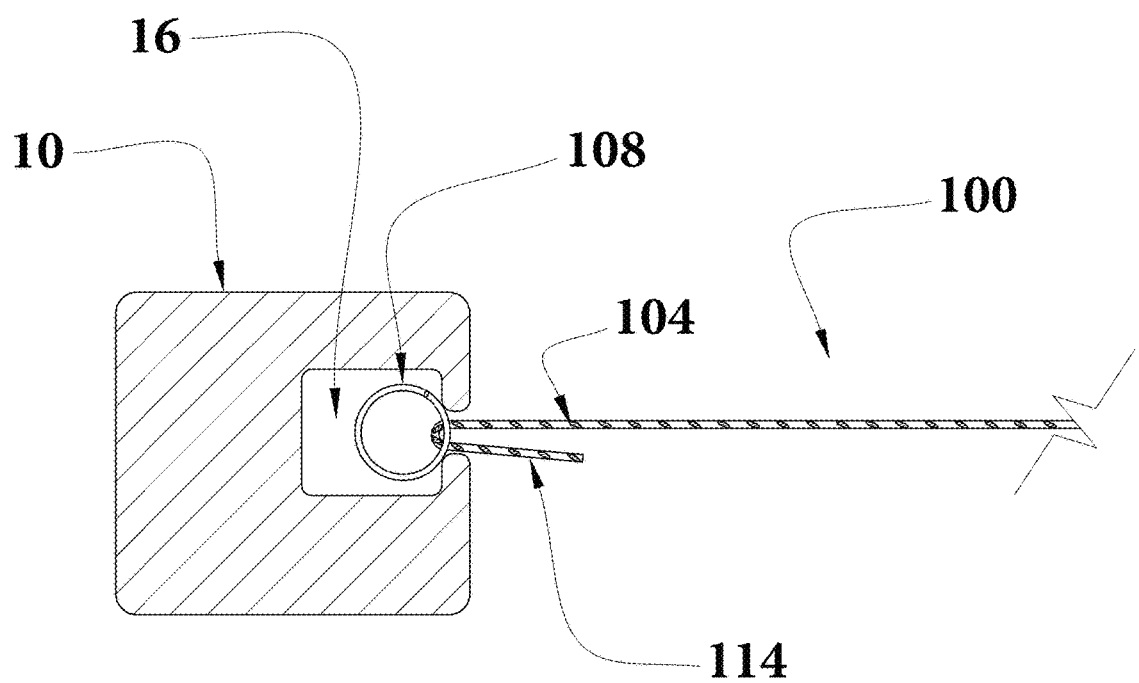
FIG. 13 provides an end cross-sectional view of the attachment assembly of FIG. 12 installed in a seating frame in accordance with the present invention.

Referring to FIG. 4, an exemplary diaphragm 100 for use with such an attachment member in accordance with the present invention comprises interwoven warp and weft yarns 102 and 104, respectively, as described above. For this embodiment, the diaphragm 100 includes an attachment zone, generally designated by reference numeral 112, where the weft yarns 104 have been omitted during weaving, and have essentially been removed. The warp yarns 102 still pass through the attachment zone 112, as they are used to attach the diaphragm 100 to the coil member 108. As noted, the spacing of the warp yarns 102 preferably is complementary to the pitch of the coil member 108. Though embodiments are herein described and shown using this attachment zone 112, alternate embodiments can use the various attachment members described herein without such an attachment zone without departing from the spirit and principles of the present invention, for example, as shown in FIGS. 12-13.

For purposes of description, the portion of the diaphragm 100 between the attachment zone 110 and the edge of the diaphragm is designated hereinafter as a selvage area 114.

Figure 5:
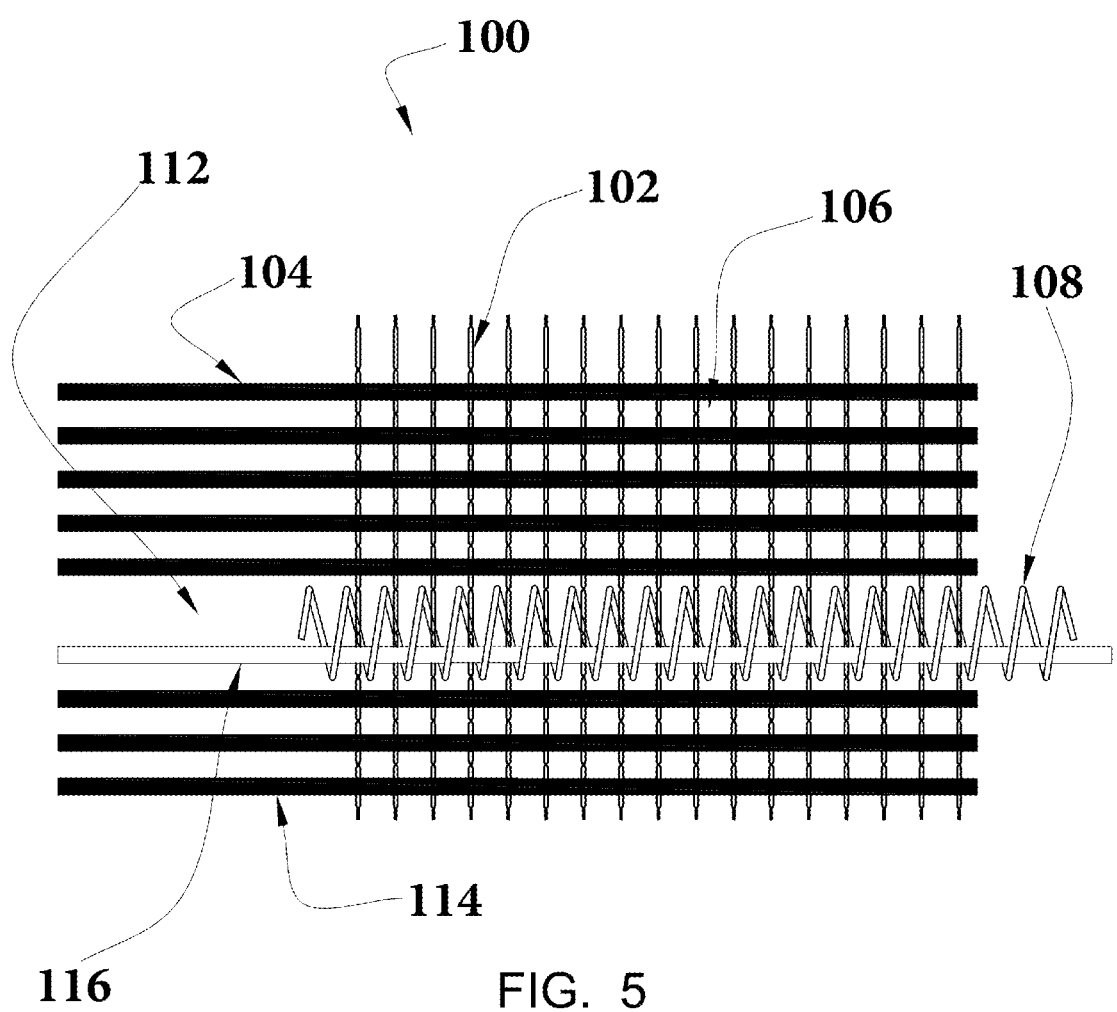
FIG. 5 illustrates a planar view an attachment assembly in accordance with an embodiment of the present invention.
Figure 6:
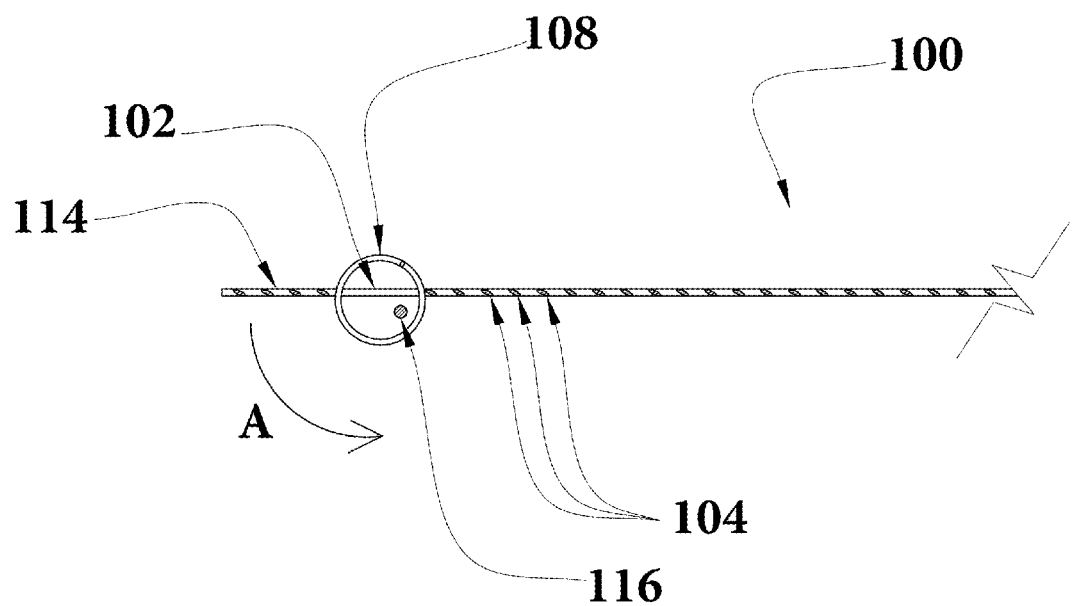
FIG. 6 provides an end cross-sectional view of the attachment assembly of FIG. 5.

To attach the diaphragm 100 to the attachment member, the coil member 108 is positioned in the attachment zone 112, as illustrated in FIG. 5. As shown, the individual loops 110 of the coil member 108 are generally positioned between warp yarns 102. In accordance with a first embodiment, an elongated bead member 116 is inserted lengthwise through the coil member 108 so that it is positioned between the coil member 108 and the warp yarns 102 of the diaphragm 100 in the attachment zone 112, such as illustrated in FIG. 6. As so positioned, when the selvage area 114 of the diaphragm 110 is folded down along arrow A shown in FIG. 6, the bead member 116 is pinched between the diaphragm 100 and the coil member 108, as shown in FIG. 7, and thereby aids in keeping the diaphragm 100 attached to the coil member 108 during installation, removal and use. The coil member 108 can then be inserted into and fed through the channel 16, such as shown in FIGS. 7 and 8.

As shown, the bead member 116 is generally a long cylindrical rod. It can be made of any material that is flexible to move and contort with the coil member 108 during installation and removal, but also be strong to withstand the tensions exerted by the diaphragm 100 pulling on the bead member 116 through the connection described above. For example, the bead member 116 can be constructed from an extruded plastic or a light-weight metal.

Figure 9:
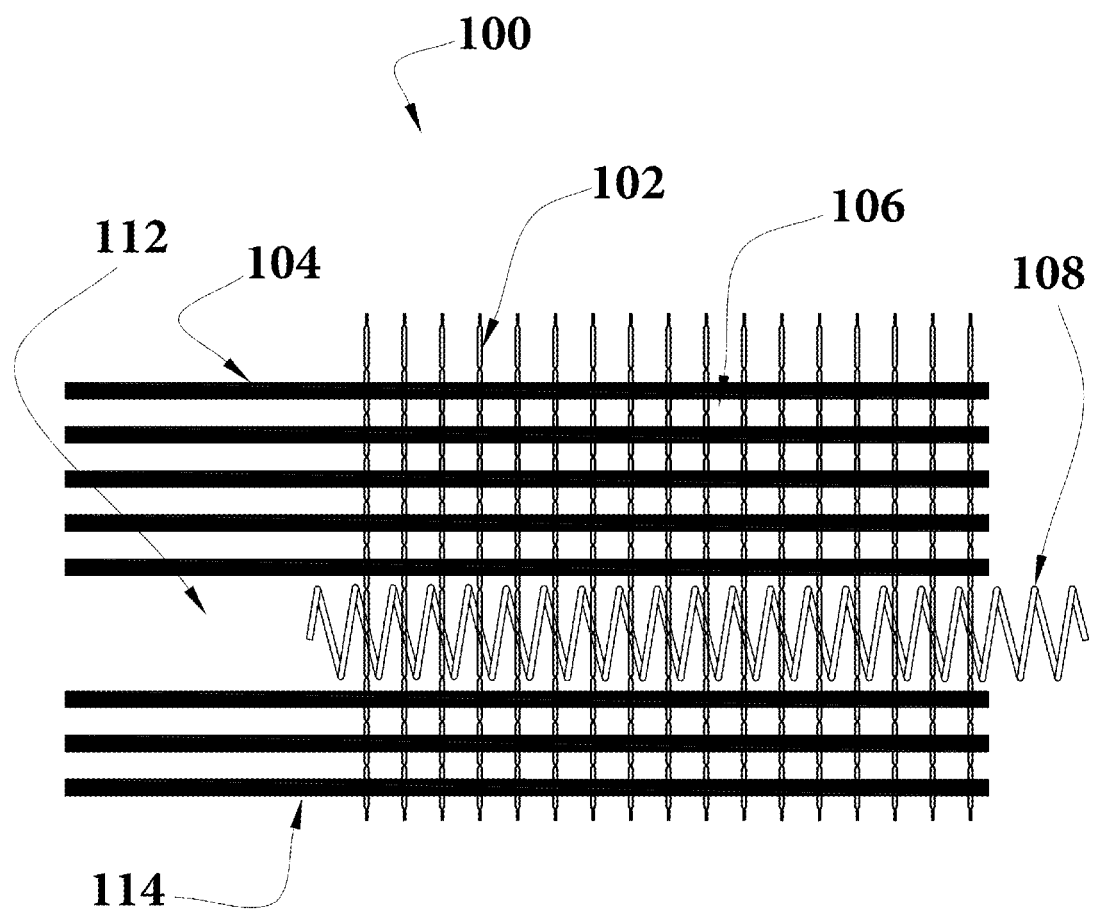
FIG. 9 illustrates a planar view of an attachment assembly in accordance with another embodiment of the present invention.
Figure 10:
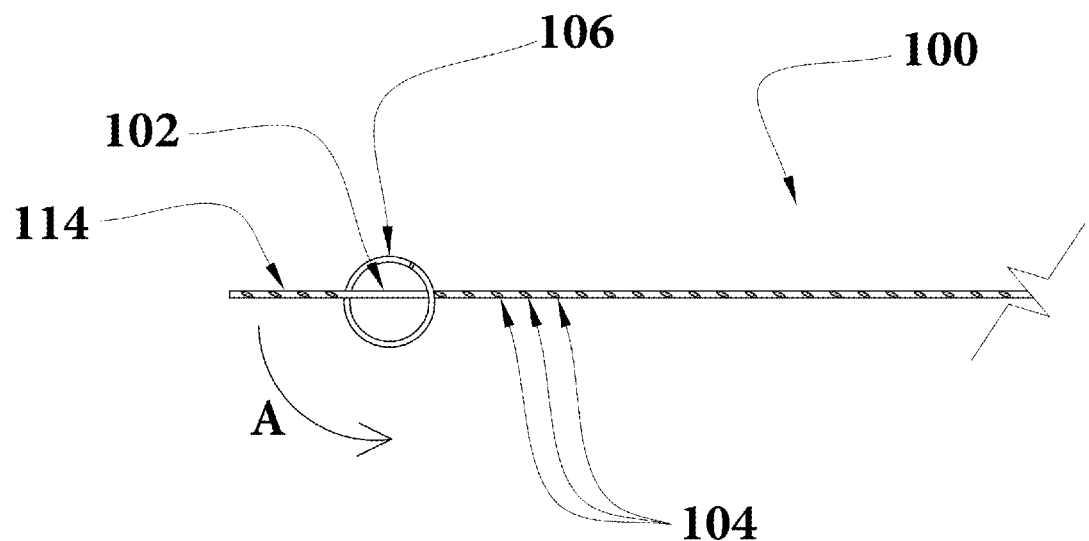
FIG. 10 provides an end cross-sectional view of the attachment assembly of FIG. 9.
Figure 11:
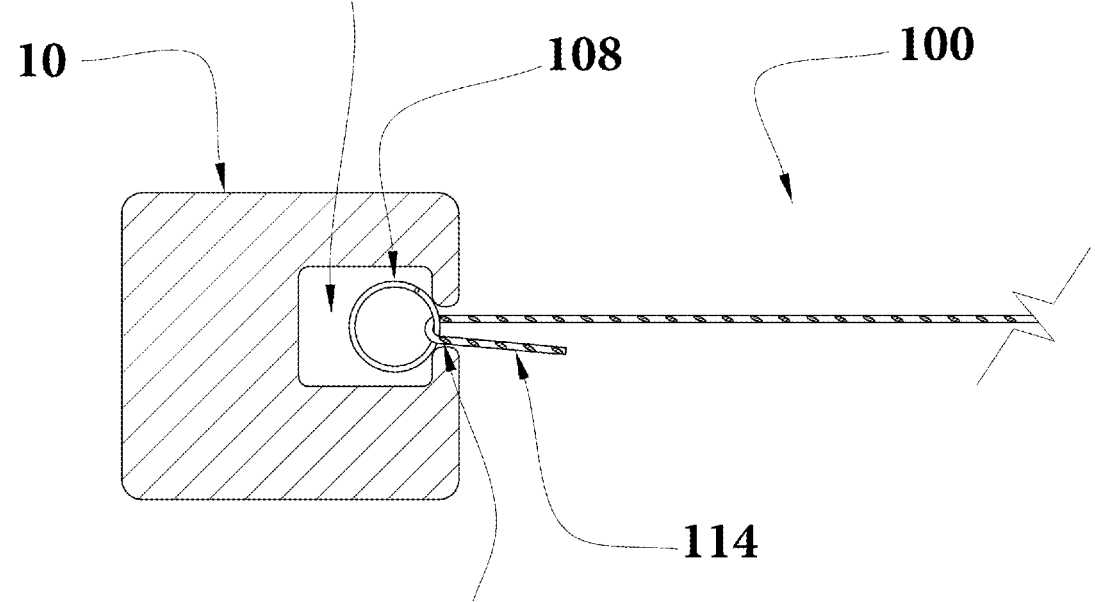
FIG. 11 provides an end cross-sectional view of the attachment assembly of FIG. 9 installed in a seating frame in accordance with the present invention.

In accordance with another embodiment of the present invention, the coil member 108 can be positioned between the warp yarns 102 as shown in FIG. 9, and when the selvage area 114 is folded along arrow A shown in FIG. 10, each warp yarn 102 crosses over an adjacent loop 110 of the coil member 108, thereby connecting the diaphragm 100 to the coil member 108 for installation, as shown in FIG. 11. The coil member 108 can then be inserted into and fed through the channel 16, such as shown in FIG. 11.

In another embodiment, a diaphragm without a predefined attachment zone can be used with the coil member. Referring to FIGS. 12-13, a coil member 108 can be twisted to feed it along the length of the diaphragm 100 so that each loop 110 overlaps with at least one warp yarn 102 or at least one weft yarn 104. Preferably, each loop 110 overlaps with one warp yarn 102 and at least one weft yarn 104. More preferably, as illustrated in FIG. 12, each loop 110 of the coil member 108 overlaps with one warp yarn 102 and two weft yarns 104. As shown, there is a general alternating pattern between the coil loops 110 and the warp yarns 102. After the coil member 108 is fed through the diaphragm 100, the selvage area 114, defined here as the area of the diaphragm 100 between the coil member 108 and the edge of the diaphragm 100, can be folded back to a position adjacent to the diaphragm 100 so that the coil member 108 can be inserted into and fed through the channel 16, such as illustrated in FIG. 13.

In FIG. 13, the cross-section of the weft yarns is designated with reference numeral 104. As shown, two weft yarns 104 are disposed inside the coil loop 110 and act to radially hold the diaphragm 100 to the coil member 108 when the selvage area 114 is folded back. Similarly, the warp yarns 102 disposed between successive loops 110 of the coil member 108, as shown in FIG. 12, act to axially hold the diaphragm 100 to the coil member 108, especially as the coil member 108 is being fed through the channel 16.

Use of the coil member 108 for installation of the diaphragm 100 reduces the friction between the diaphragm 100 and the channel 16. The coil member 108 can experience a considerable load from tension on a tightly stretched diaphragm 100. This total load results from tensions all along the length of the diaphragm 100. However, because the coil member 108 is attached by engaging each successive loop 110 with limited tensioned yarns, each loop 110 only carries the load of just that portion of the diaphragm 100. This makes possible a lighter weight system and lowers the friction between the coil member 108 and the seating frame 10. The lower friction also allows for easier installation and removal.

Additionally, the coil member 108 is typically flexible as a result of its general design and nature, and as a result, can readily be used in contoured and curved channels with minimal risk of catching, twisting of otherwise failing. Additionally, use of the coil member 108 to facilitate installation and removal of a diaphragm in accordance with the present invention can easily accommodate high pre-tensioned diaphragms and greatly reduce the risk of warping, twisting or distorting the diaphragm during installation and removal.

Figure 14:
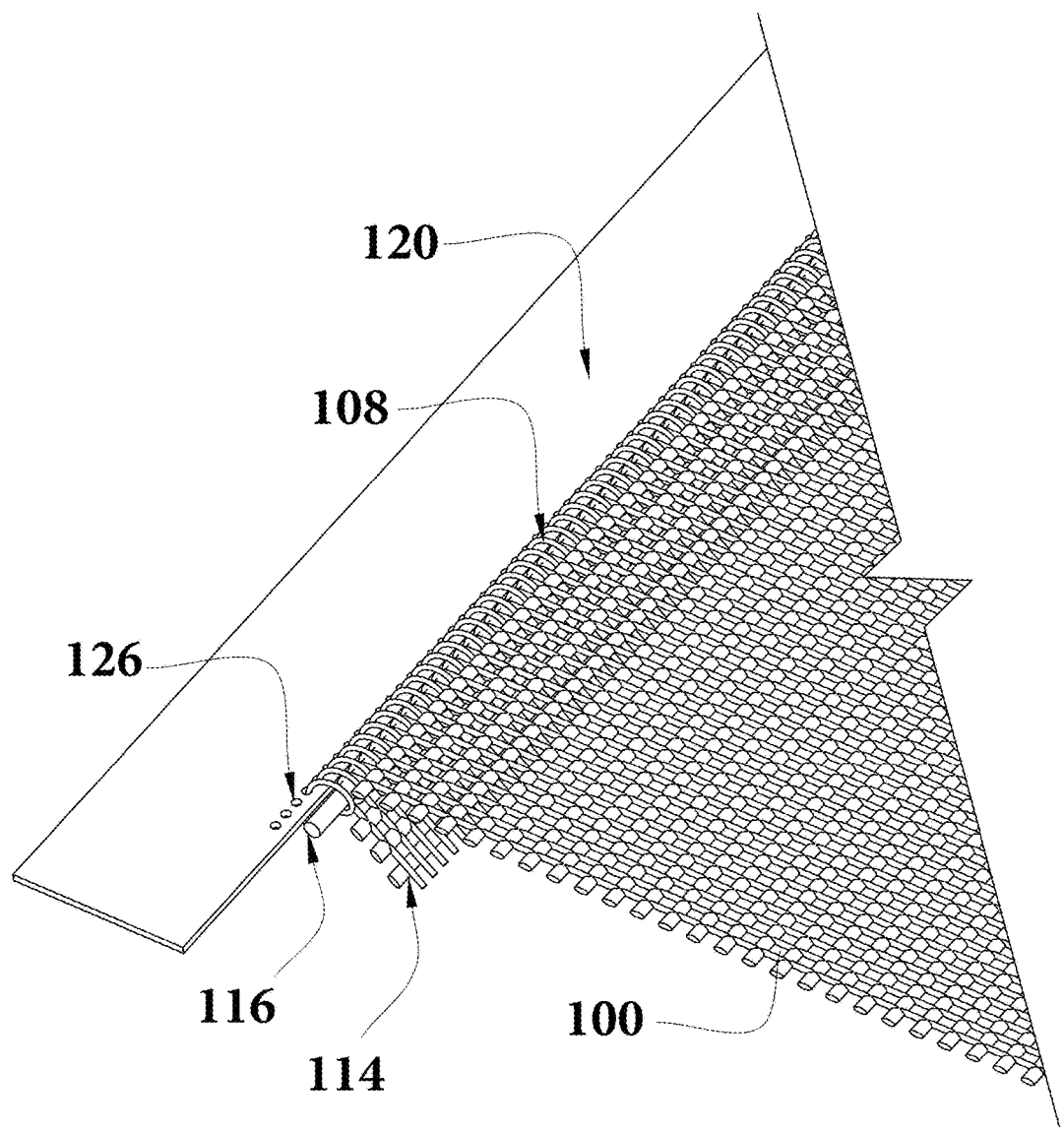
FIG. 14 provides a perspective view of an attachment assembly in accordance with another embodiment of the present invention.
Figure 15:
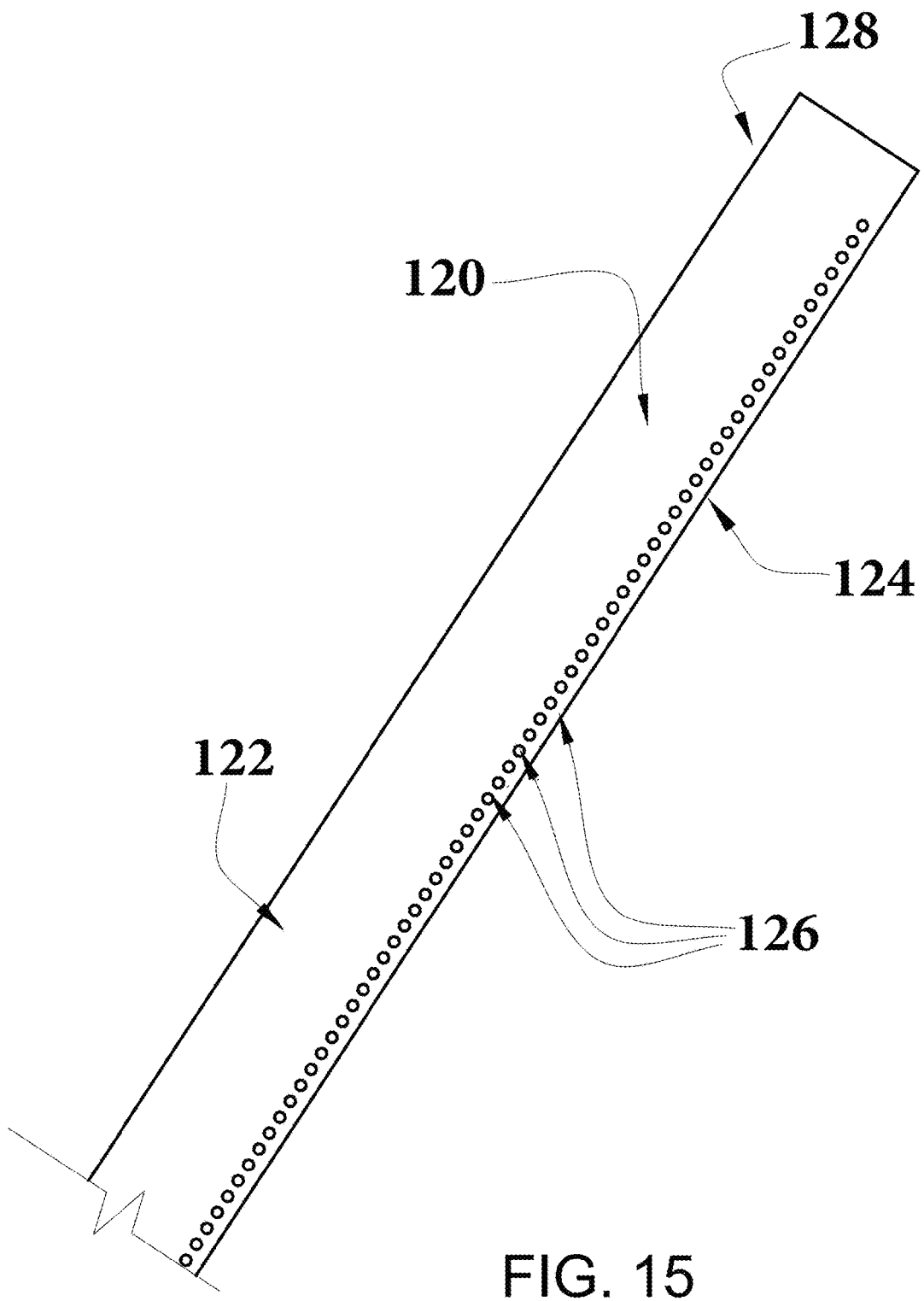
FIG. 15 illustrates an adapter strip for use in the attachment assembly of FIG. 14.
Figure 16:
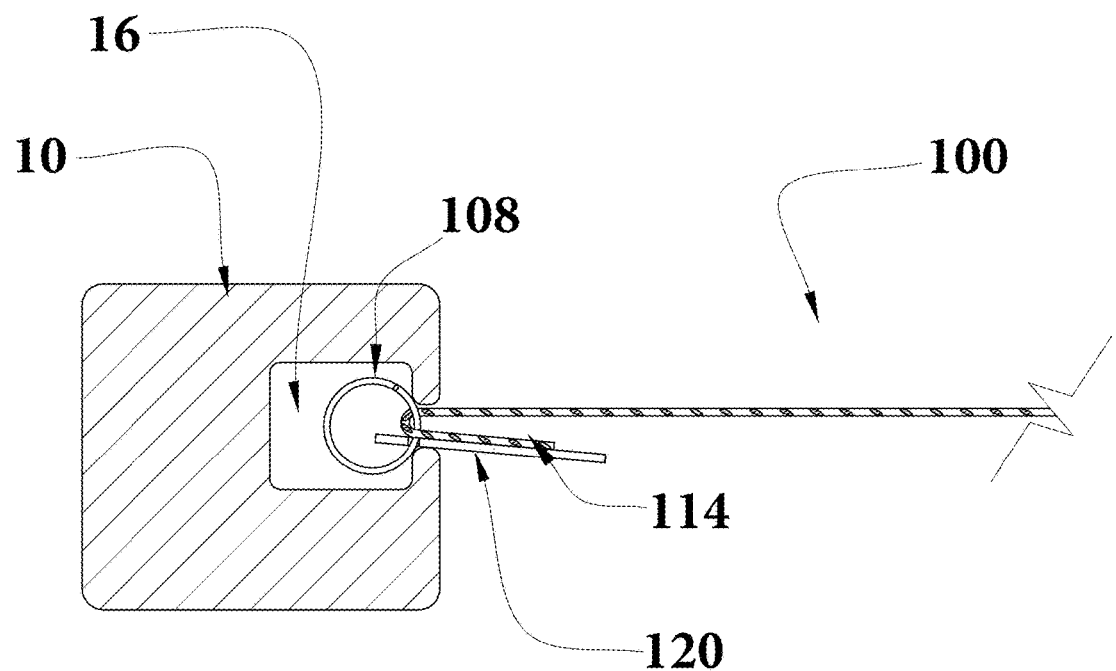
FIG. 16 provides an end cross-sectional view of the attachment assembly of FIG. 14 installed in a seating frame in accordance with an embodiment of the present invention.

An alternate attachment member that may be used to facilitate installation and removal of a diaphragm 100 in accordance with an embodiment of the present invention is illustrated in FIGS. 14-16. As shown, an attachment member adds an adapter strip 120 for use with the coil member 108 previously described. The adapter strip 120, shown in more detail in FIG. 15, comprises a flat web 122 having a first edge 124 with a line of perforations 126 and a second free edge 128. The web 122 can be constructed of any material suitable to withstand the forces to be exerted upon the adapter strip 120 to install, remove or secure a diaphragm 100, and more particularly a tensioned diaphragm in place on a seating frame 10, such as a sheet of plastic, metal, or a woven or non-woven fabric. The spacing of the line of perforations 126 preferably matches the pitch of the coil member 108 so as to facilitate threading of the coil member 108 through the perforations 126.

In one embodiment of the present invention, the adapter strip 120 is used to aid in feeding the coil member 108 through the channel 16. For example, after the coil member 108 is attached to the diaphragm 100 in the one of the manners described herein, it can be threaded through the line of perforations 126 to attach the coil member 108 and the diaphragm 100 to the adapter strip 120, as shown in FIG. 14. Once so attached, the adapter strip 120 can be folded back next to the folded selvage area 114 to a position adjacent to, and preferably flush with the diaphragm 100, as shown in FIG. 16. The coil member 108 can be inserted into the channel 16 in the seating frame 10 and fed through the channel 16 with the assistance of pulling on the second free edge 128 of the adapter strip 120.

Figure 17:
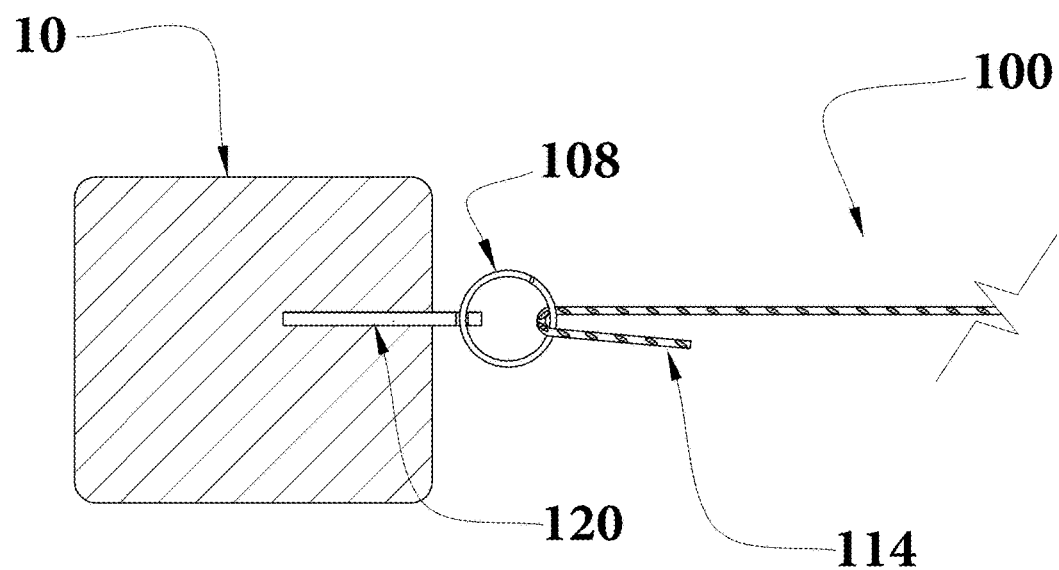
FIG. 17 provides an end cross-sectional view of the attachment assembly of FIG. 14 installed in a seating frame in accordance with an alternate embodiment of the present invention.

In an alternate embodiment, the adapter strip 120 can be used instead of the channel 16 in the seating frame 10. That is, an adapter strip 120, much as described above, can be secured to the vertical members 12 of the seating frame 10, as shown in FIG. 17. After the coil member 108 is attached to the diaphragm 100 in one of the manners described herein, it can be threaded through the line of perforations 126 in the adapter strip 120 to feed the diaphragm 100 along the adapter strip 120, thereby attaching the diaphragm 100 to the seating frame 10. Alternately, the coil member 108 can be threaded into the diaphragm 100 and the line of perforations 126 simultaneously. To remove the diaphragm 100 from the seating frame 10, the coil member 108 can simply be unthreaded from the line of perforations 126.

Figure 18:
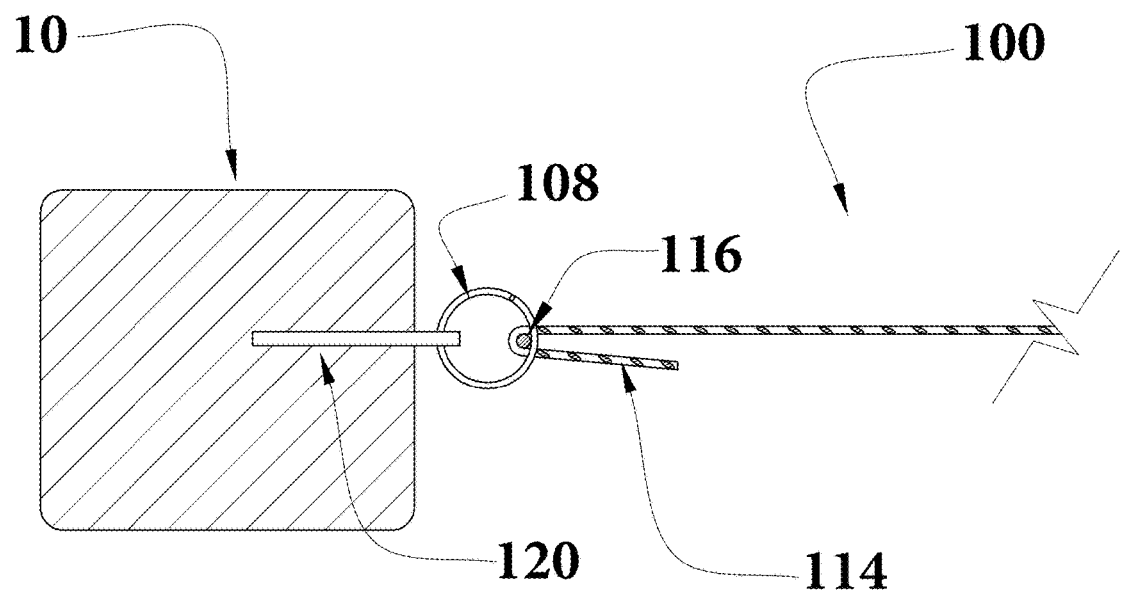
FIG. 18 provides an end cross-sectional view of the attachment assembly of FIG. 7 installed in a seating frame in accordance with an alternate embodiment of the present invention.

FIG. 18 illustrates use of the adapter strip in this manner to receive the diaphragm 100 as connected to the coil member 108 using the assembly shown in FIGS. 5-7 and described above.

The connection of the diaphragm 100 to the coil member 108 is stronger when intertwined at a distance from the edge of the diaphragm 100 than if the coil member 108 were connected right at the edge. The specific location of the coil member 108 from the edge of the diaphragm 100—and thus both the position of the attachment zone 112, if used, and the length of the selvage area 114—is generally determined by the size of the diaphragm 100 and the amount of stretch that will be needed in the installed diaphragm.

Referring to FIGS. 7 and 11, for example, the selvage area 114 can be folded over and against the diaphragm 100 to hide it after installation.

Figure 19:
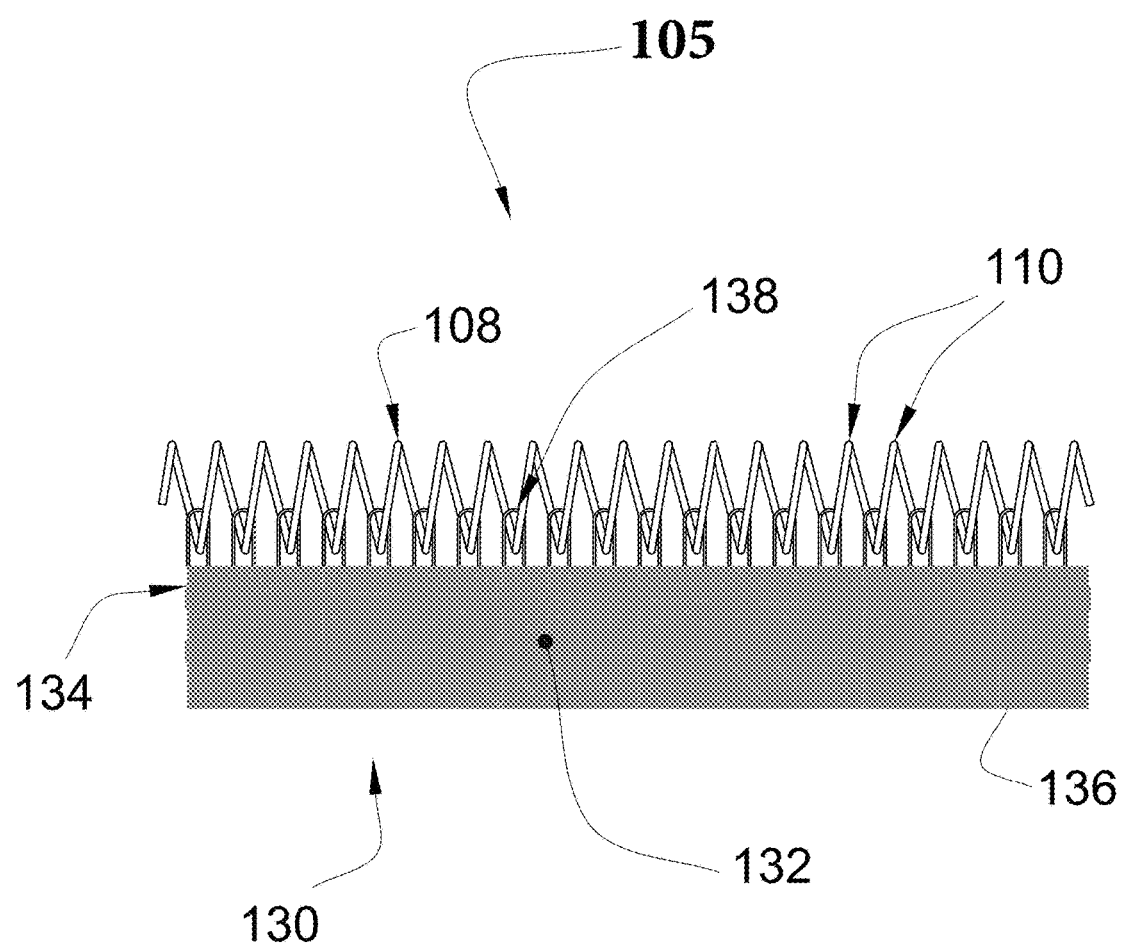
FIG. 19 illustrates an attachment assembly in accordance with another embodiment of the present invention isolated from diaphragm.
Figure 20:
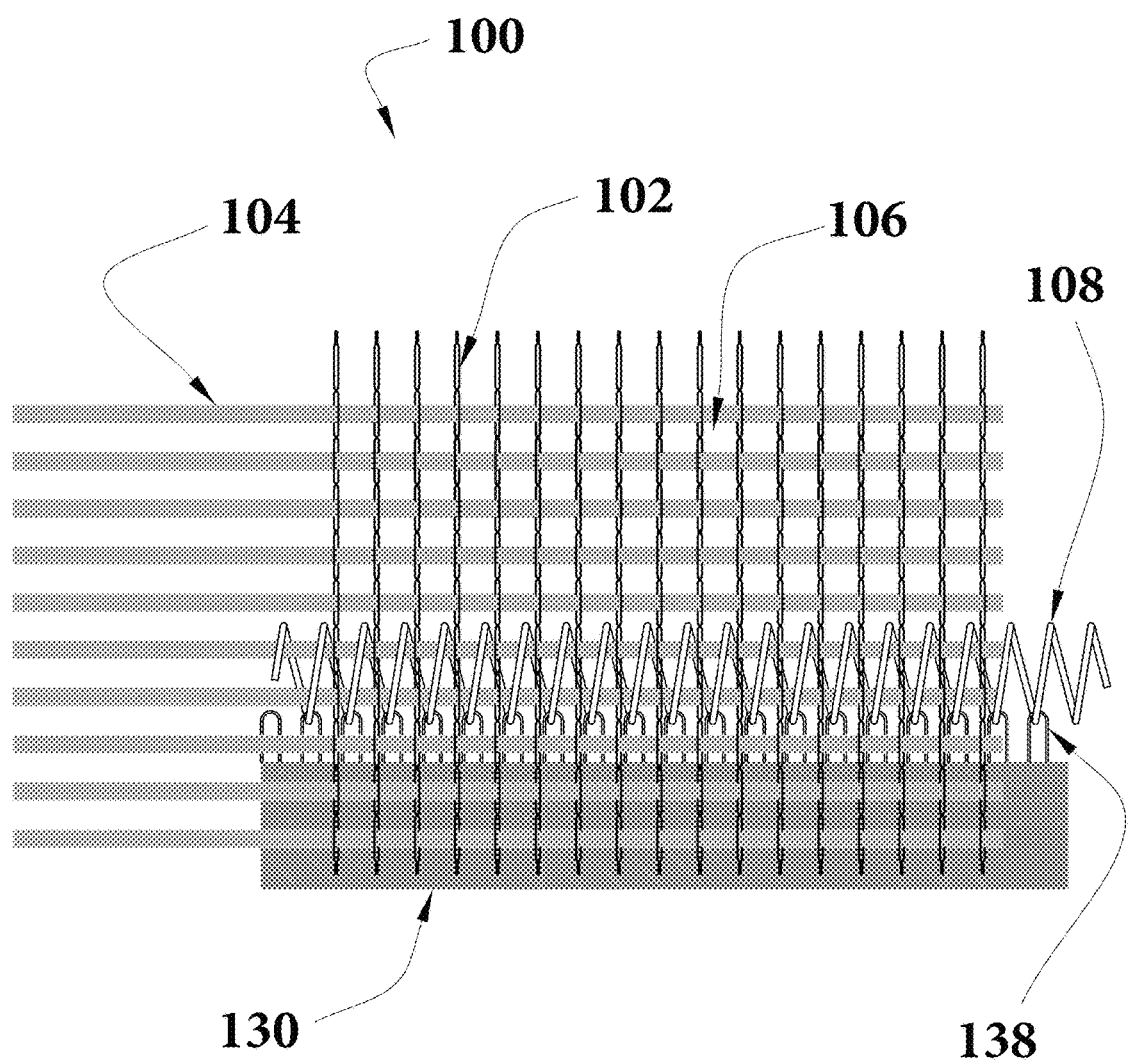
FIG. 20 illustrates a planar view of the attachment assembly of FIG. 19 connected with a diaphragm.
Figure 21:
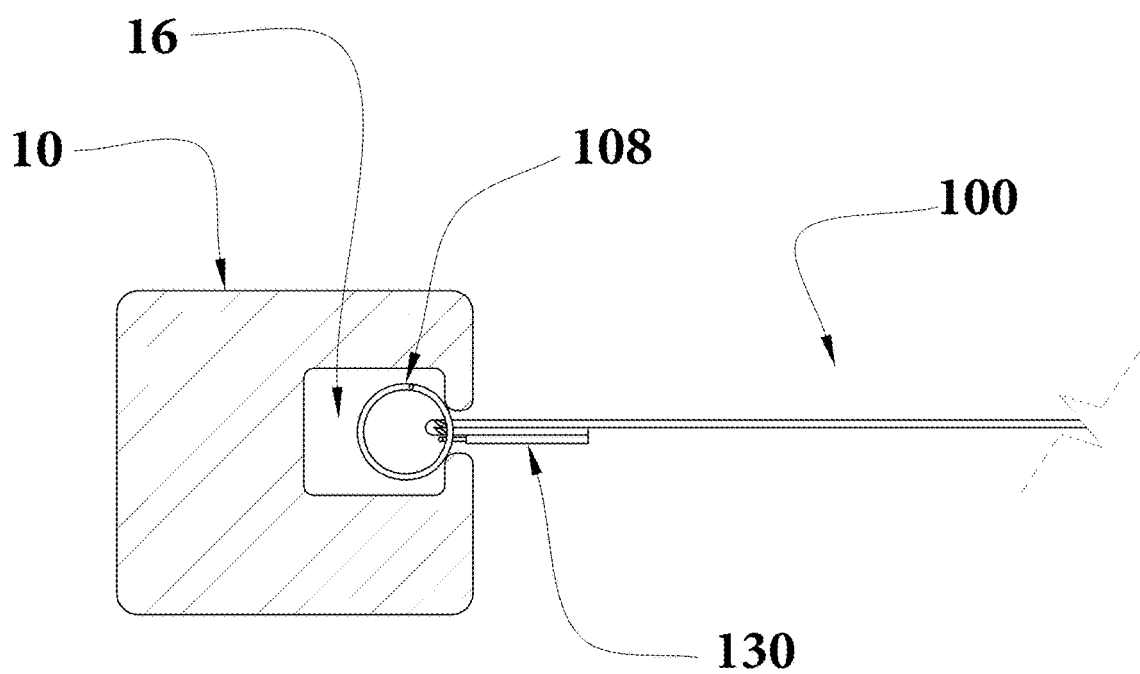
FIG. 21 provides an end cross-sectional view of the attachment assembly of FIG. 19.

Referring to FIGS. 19-21, an alternate embodiment for installation and removal of a diaphragm to a seating frame is illustrated. An open mesh diaphragm 100 generally comprising interwoven warp and weft yarns 102 and 104, respectively, is provided with an attachment member 105 for installation of the diaphragm 100 in a seating frame 10 having channels 16 adapted to receive a portion of the diaphragm 100, as shown in FIG. 20. The attachment member 105 comprises an adapter strip 130 and a coil member 108, as shown in FIG. 19. The coil member 108 is adapted to be intertwined with the weave of the diaphragm 100 and thereafter inserted into and held by a channel 16 in the seating frame 10, as shown in FIG. 21.

Referring to FIG. 19, the adapter strip 130 comprises a web 132 having an open loop fringe on a first edge 134 thereof and a free second edge 136, whereby the coil member 108 is fed through the open loops 138 of the adapter strip 130 to secure said adapter strip 130 to the coil member 108. Preferably, the coil member 108 is simultaneously fed through the open loops 138 of the adapter strip 130 and the weave openings 106 of the diaphragm 100, as shown in FIG. 20. In this regard, the spacing of the open loops 138 on the adapter strip 130 is generally the same as the pitch of the coil member 108. Additionally, this spacing is also generally the same as the spacing of the warp yarns 102 and the openings 106 of the diaphragm 100. The relative spacing for the diaphragm mesh, the coil member 108 and the open loops 138 of the adapter strip 130 are shown in FIG. 20.

Once the attachment member 105 is attached to the diaphragm 100, the adapter strip 130 is folded toward the diaphragm 100, capturing a selvage area 114 of the diaphragm 100 therebetween, as shown in FIG. 21. Thereafter, the coil member 108 can be fed into and through the channel 16 of the seating frame 10 by pulling on the free second edge 136 of the adapter strip 130. Once the coil member 108 is fully fed into through the channel 16, the adapter strip 130 can be left adjacent to and preferably flush with the diaphragm 100. In this regard, the adapter strip 130 provides added strength to the diaphragm 100 along its vertical edges.

The adapter strip 130 can be constructed from any material, including but not limited to a plastic or polymeric web, a metal sheet, such as aluminum, or a woven or non-woven fabric or tape. For example, the adapter strip 130 can comprise a support tape woven from yarns of a strong, high tenacity fiber, preferably a para-aramid such as DuPont Kevlar. The web may be woven to form the short loop fringe along the first edge 134, where the loops 138 are spaced to align with the openings 106 of the diaphragm 100. This allows the coil element 108 to be simultaneously fed through the loops 138 of the adapter strip 130 and the openings 106 in the fabric so that each successive loop 110 of the coil element 108 passes through a corresponding loop 138 of the adapter strip 130 and overlaps with a corresponding warp yarn 102 of the diaphragm 100 to secure the attachment member 105 to the diaphragm 100.

As noted, the adapter strip 130 essentially provides a pulling strap that can be used to pull the attachment assembly through the channel 16 during installation. Thus, the adapter strip 130 can experience a considerable load from friction between a tightly tensioned diaphragm 100 and the channel 16. This makes a strong adapter strip 130 generally beneficial for carrying the total load resulting from the full length of the diaphragm 100. However, because the adapter strip 130 is engaged to the coil element 108 at each successive loop 110 thereof, each fringe loop 138 of the adapter strip 130 only carries the load of moving just that portion of the entire assembly.

The adapter strip 130 may be eliminated in embodiments where the diaphragm 100 can be moved into position relative to the seating frame 10 prior to coming under tension. Such an arrangement is shown in FIGS. 12-13.

Figure 22:
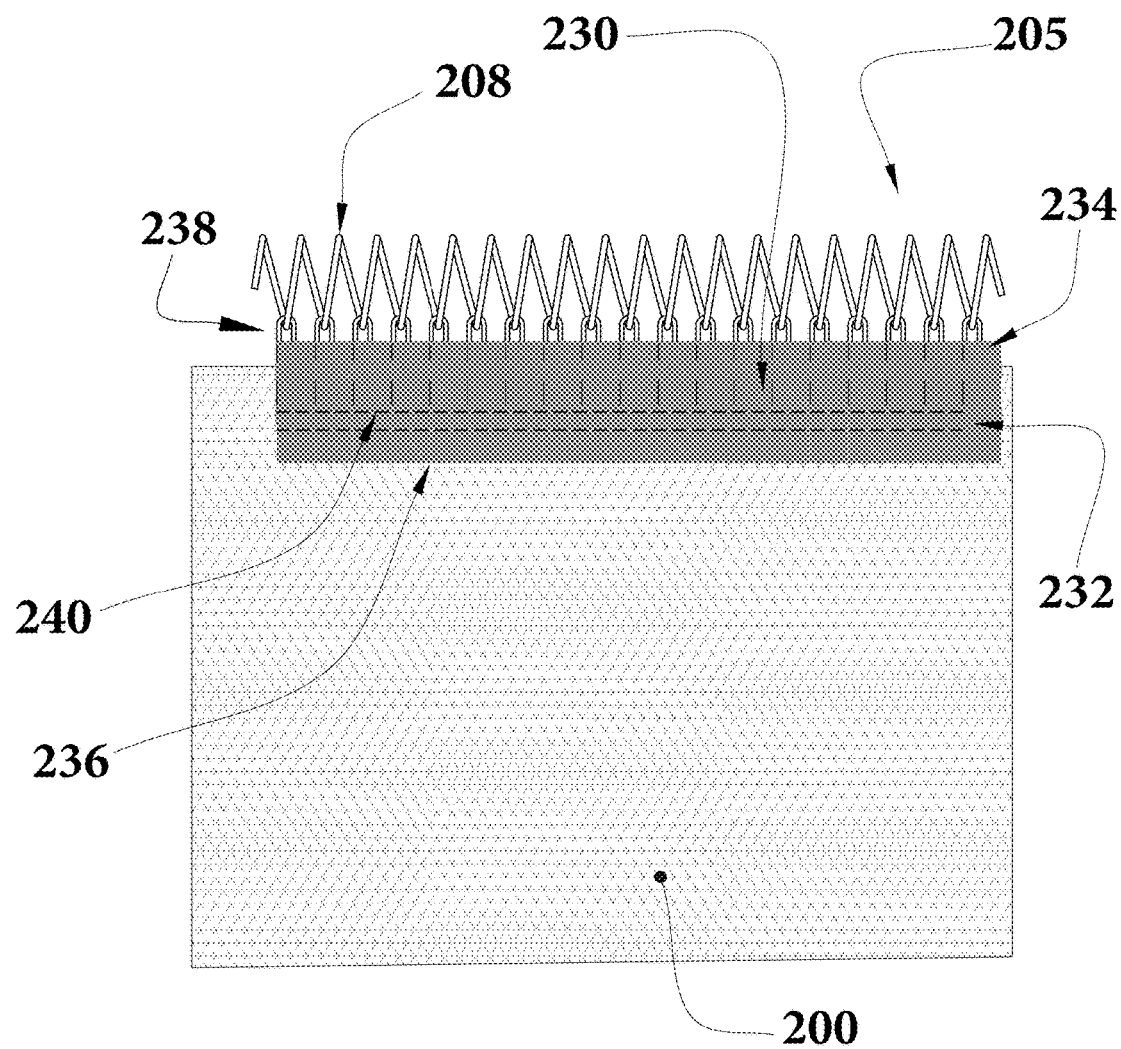
FIG. 22 illustrates a planar view of an attachment assembly in accordance with another embodiment of the present invention.

The diaphragm need not be a woven open mesh fabric. In yet another embodiment of the present invention illustrated in FIGS. 22-23, an attachment arrangement is provided that allows the present invention to be applied to closed fabric weaves, films, or closed elastomeric fabrics (collectively referred to hereinafter as "closed fabric diaphragm"). Referring to FIG. 22, a closed fabric diaphragm 200 is provided with an attachment member 205 for installation of the diaphragm 200 in a seating frame 10 having channels 16 adapted to receive a portion of the attachment member 205 to hold the diaphragm 200 in place relative to the seating frame 10. Similar to the embodiment illustrated in FIGS. 19-21, the attachment member 205 comprises an adapter strip 230 and a coil member 208. When a closed fabric diaphragm 200 is used, the adapter strip 230, constructed similar to the strip 130 shown in FIG. 20, joins the diaphragm 200 to the coil member 208.

Figure 23:
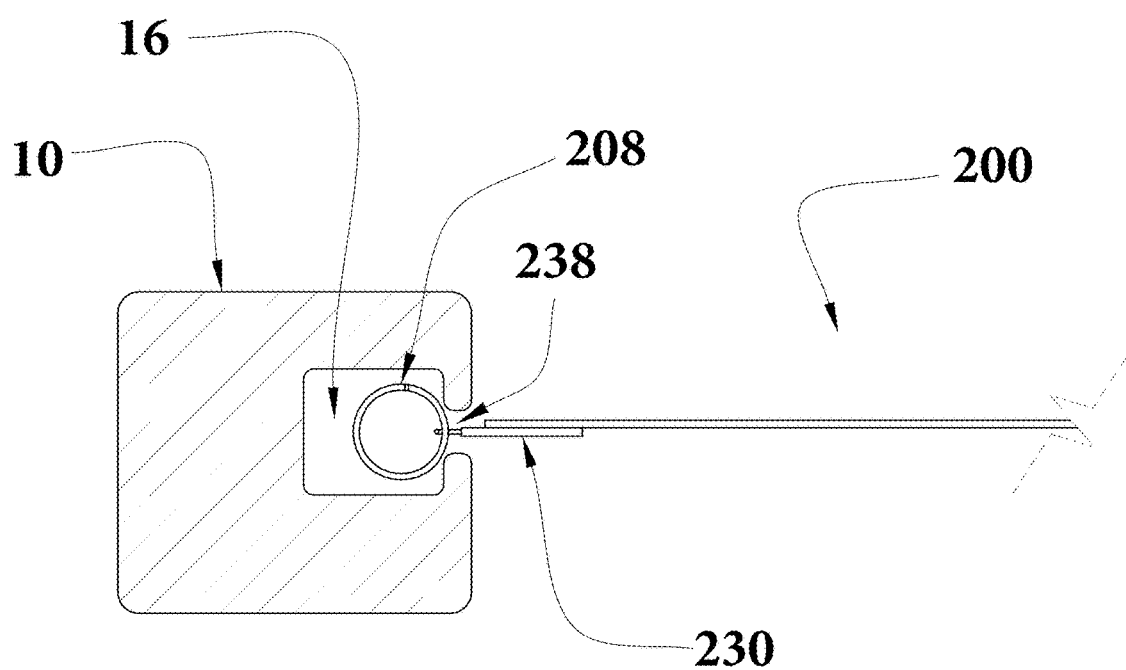
FIG. 23 provides an end cross-sectional view of the attachment assembly of FIG. 22.

As shown in FIG. 22, the adapter strip 230 comprises a web 232 having an open loop fringe on a first edge 234 thereof and a second edge 236 that is secured to the diaphragm 200 so that the open loops 238 project away from the diaphragm 200. For example, the adapter strip 230 can be sewn with stitches 240 to the closed fabric diaphragm 200. The coil member 208 is threaded through the open loops 238 and thereafter fed through the channel 16 to install the diaphragm 200 to the seating frame 10, as shown in FIG. 23. If necessary, the adapter strip 230 can be pulled to aid in feeding the coil member 208 through the channel 16 much in the same manner as described above for other embodiments. Likewise, the adapter strip 230 can be used to draw the coil member 208 out of the channel 16 when removing the diaphragm 200.

The spacing of the open loops 238 on the adapter strip 200 is generally the same as the pitch of the coil member 208. This facilitates threading of the coil member 208 through the open loop fringe of the adapter strip 230. The relative spacing for the diaphragm mesh, the coil member 208 and the open loops 238 of the adapter strip 230 are shown in FIG. 22.

The ability to hold a diaphragm in a pre-tensioned, stretched size and form is very valuable when installing it on a seating frame in the field as a replacement part. The assembly equipment originally used to stretch the diaphragm during manufacture of the seat is not usually available in the field. Accordingly, it is desirable to be able to have replacement diaphragms that are pre-tensioned and can stay at a desired level of tensioning during transport, storage and most importantly, installation.

Figure 24:
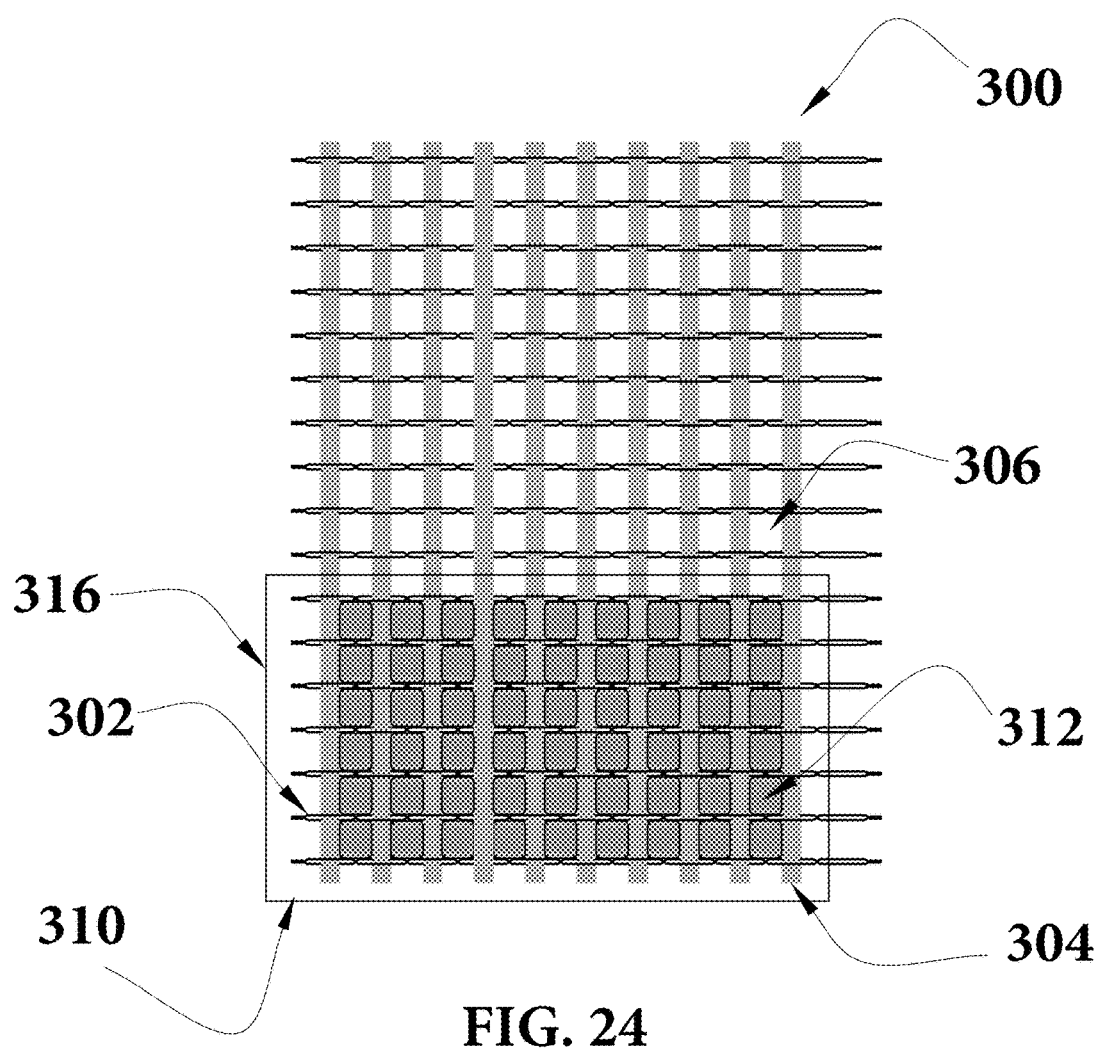
FIG. 24 illustrates a planar view of a replacement diaphragm arrangement for installation into a seating frame using a retainer sheet in accordance with an embodiment of the present invention.
Figure 25:
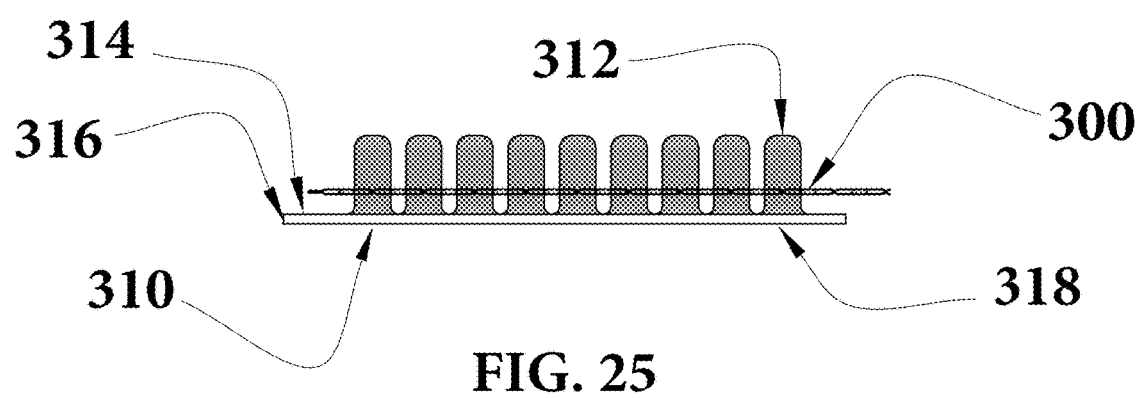
FIG. 25 provides a planar end view of the replacement diaphragm arrangement of FIG. 24.

Referring to FIGS. 24-25, a novel replacement diaphragm arrangement for seats is shown. In accordance with the present invention, the replacement diaphragm 300 is preferably supplied as a pre-tensioned open mesh fabric, similar to the diaphragm 100 shown in FIG. 2, held in a stretched condition by a novel retainer sheet 310, illustrated in FIGS. 24 and 25. The retainer sheet 310 comprises a flexible sheet of material acting as a filler to keep the open spaces 306 in the stretched open weave fabric from closing to their normal non-stretched size and condition.

As shown, the retainer sheet 310 includes a plurality of projections 312 covering a first face 314 of a base membrane 316 and extending normally therefrom for insertion into and through the open spaces 306 of the diaphragm 300 during use. As illustrated in FIG. 24, the projections 312 have a size and shape designed to complement the size and shape of the openings 306 in the mesh after it has been stretched to the desired dimensions needed for installation into the seating frame. FIG. 25 illustrates the insertion of the projections 312 into and through the openings 306 of the diaphragm 300. As shown, the projections 312 are preferably inserted far enough so that the base membrane 316 of the retainer sheet 310 is adjacent to and, more preferably, flush with the diaphragm 300.

The retainer sheet 310 need not be thick or strong. The retainer sheet 310 does not hold the tension of the stretched fabric. It only holds the projections 312 in place within the openings 306 while the projections 312 resist the load of the contacting fabric. The retainer sheet 310 does, however, need to be strong enough to withstand the pulling required to extract the projections 312 from the mesh openings 306 in the diaphragm 300 once the diaphragm 300 has been installed in a seating frame 10. This load, however, is not very high, because only a small portion of the retainer sheet 310 needs to be removed at a time. In this regard, the retainer sheet 310 is preferably removed by a peeling action. It is intended for the retainer sheet 310 to be reusable, and thus it must have sufficient rigidity and strength to withstand multiple uses, while not compromising its flexibility for installation, removal, and use, as desired.

The retainer sheet 310 is constructed in several ways as to suit a particular mesh fabric depending on weave and varying requirement, such as cost and sustainability. One way to construct the retainer sheet 310 is to thermoform a plastic sheet with heated forming rollers or vacuum/pressure forming dies. Another way is by compression molding plastic compounds with matched pressure molds. This latter method is also suitable for biodegradable materials such as organic pulps combined with biopolymer resins. When needed, as with very thin sheets, a woven fabric backer can be integrally molded or laminated to the smooth second face 318 of the retainer membrane 316—that is opposite to the first face 314 from which the projections 312 extend—which backer provides added stability, rigidity, sustainability, and strength, permitting the retainer sheet to withstand multiple uses while holding up to the tensions exerted on the retainer sheet and projections. Preferably, such a backer sheet does not compromise the flexibility that permits the retainer sheet to be removed from a diaphragm after installation by a peeling action.

In operation, a pre-tensioned diaphragm 300 is first constructed by stretching the diaphragm 300 to create the desired tension. Once the desired tension is achieved, the retainer sheet 310 is installed to the mesh diaphragm 300 by pressing it onto the surface of the diaphragm 300 while forcing the projections 312 into and through the openings 306 between the warp and weft yarns 302 and 304, respectively, of the mesh fabric. Preferably, the projections 312 are inserted through the openings 306 and the retainer sheet 310 is pressed against the diaphragm 300 so that the base membrane 316 of the retainer sheet 310 is adjacent to and, more preferably, flush with the diaphragm 300. The retainer sheet 310 can also be installed by pressing the stretched diaphragm 300 onto the protrusions 312 using a roller with a resilient cover.

Once installed, the projections 312 prevent the openings 306 from returning to their free-state size and condition, since the projections 312 are relatively incompressible and resist the contraction of the tensioned warp and weft yarns 302 and 304. Therefore, the tensioned yarns 302, 304 and openings 306 cannot contract, and thus, the diaphragm 300 is held in its pre-tensioned, stretched condition until the retainer sheet 310 is removed, as described above.

The retainer sheet 310 provides an optimal combination of strength—in order to resist contraction of the diaphragm 300 from its tensioned condition—and flexibility—in order to permit manipulation of the stretched diaphragm 300 to feed it through the seating frame 10 during installation. For example, when the retainer sheet 310 is attached to the diaphragm 300, the combined diaphragm 300 and retainer sheet 310 can still be twisted, bent or otherwise manipulated while maintaining the tension of the diaphragm 300. This allows installation of the pre-tensioned diaphragm 300 onto contoured frames as is desirable in transportation applications.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular uses contemplated.

What is claimed is:

1. A method for forming a seat by installing a seating diaphragm to a seating frame, wherein said diaphragm comprises an open weave of warp and weft yarns defining a plurality of openings therebetween, said method comprising:
   stretching the diaphragm to a desired tension wherein each of said openings in the diaphragm has a tensioned size and shape;
   providing a retainer sheet for maintaining the desired tension of the diaphragm when it is installed onto the seating frame, wherein said retainer sheet comprises a generally flat base membrane having a plurality of projections projecting outwardly therefrom, each of said projections having a cross-sectional size and shape that complements the tensioned size and shape of the openings in the diaphragm;
   attaching the retainer sheet to the stretched diaphragm by inserting each projection in a respective opening of the diaphragm;
   installing the diaphragm to the seating frame; and
   removing the retainer sheet from the diaphragm after the diaphragm is installed onto the seating frame.

2. The method according to claim 1, wherein the step of removing the retainer sheet from the diaphragm comprises peeling the retainer sheet off the diaphragm.

3. The method according to claim 1, wherein the step of removing the retainer sheet from the diaphragm comprises pressing the projections back through the openings until the retainer sheet is disengaged from the diaphragm.

4. The method according to claim 1, wherein each of the projections is tapered.

5. The method according to claim 1, wherein the plurality of projections extend normally from the base membrane.

6. The method according to claim 1, wherein the plurality of projections are arranged in a grid pattern on the base membrane.

7. The method according to claim 1, wherein the step of attaching the retainer sheet comprises inserting each projection into and through a respective opening to a position where the base membrane of the retainer sheet is adjacent to the diaphragm.

8. The method according to claim 7, wherein the step of inserting each projection into and through a respective opening further comprises inserting each said projection to a position where the base membrane of the retainer sheet is generally flush with the diaphragm.

9. The method according to claim 1, wherein the retainer sheet, when attached to the diaphragm, does not inhibit flexing of the diaphragm as it is being installed in the seating frame.

10. The method according to claim 1, wherein the step of attaching the retainer sheet comprises inserting each projection into a respective opening of the diaphragm, and pressing on an opposing face of the base membrane until the projections are snuggly fit into their respective openings.

11. The method according to claim 10, wherein the steps of inserting each projection of the retainer sheet into a respective opening of the diaphragm and pressing on the opposing face of the base member further comprises using a roller applied to the opposing face of the base membrane.

12. The method according to claim 1, wherein the retainer sheet further includes a backer sheet attached to the base membrane on a face thereof opposing the face with the projections extending therefrom.

13. The method according to claim 12, wherein the backer sheet is either molded or laminated to the opposing face of the base membrane.

14. The method according to claim 12, wherein said backer sheet comprises a woven fabric.

15. A method for forming a seat by installing a seating diaphragm to a seating frame, wherein said diaphragm comprises an open weave of warp and weft yarns defining a plurality of openings therebetween, said method comprising:
   stretching the diaphragm to a desired tension wherein each of said openings in the diaphragm has a tensioned size and shape;
   providing a retainer sheet for maintaining the desired tension of the diaphragm when it is installed onto the seating frame, wherein said retainer sheet comprises a generally flat base membrane having a plurality of projections projecting outwardly and normally extending therefrom and being arranged on said base membrane in a grid pattern, each of said projections having a cross-sectional size and shape that complements the tensioned size and shape of the openings in the diaphragm;
   attaching the retainer sheet to a portion of the stretched diaphragm by inserting each projection in a respective opening of the diaphragm until the projections are snuggly fit into their respective openings;
   installing the diaphragm to the seating frame; and
   removing the retainer sheet from the diaphragm after the diaphragm is installed onto the seating frame.

16. The method according to claim 15, wherein the step of attaching the retainer sheet comprises inserting each projection into and through a respective opening to a position where the base membrane of the retainer sheet is adjacent to the diaphragm.

17. The method according to claim 16, wherein the step of inserting each projection into and through a respective opening further comprises inserting each said projection to a position where the base membrane of the retainer sheet is generally flush with the diaphragm.

18. The method according to claim 15, wherein the step of removing the retainer sheet from the diaphragm comprises peeling the retainer sheet off the diaphragm.

19. The method according to claim 15, wherein the retainer sheet further includes a backer sheet attached to the base membrane on a face thereof opposing the face with the projections extending therefrom.

* * * * *